United States Patent [19]

Azure

[11] 4,016,542
[45] Apr. 5, 1977

[54] ELECTRONIC NOTEBOOK FOR USE IN DATA GATHERING, FORMATTING AND TRANSMITTING SYSTEM

[75] Inventor: Leo L. Azure, Richland, Wash.

[73] Assignee: Azurdata, Inc., Richland, Wash.

[22] Filed: Apr. 23, 1974

[21] Appl. No.: 463,400

[52] U.S. Cl. .......................................... 340/172.5
[51] Int. Cl.² ........................ G06F 3/14; G06F 17/06
[58] Field of Search ..... 340/172.5, 173 R, 173 RC, 340/174 A, 174.1 P, 174.1 R, 347 AD, 347 DA, 324; 445/1

[56] References Cited
UNITED STATES PATENTS

| | | | |
|---|---|---|---|
| 3,569,940 | 3/1971 | McFadden et al. | 340/172.5 |
| 3,571,802 | 3/1971 | Serra | 340/172.5 |
| 3,593,313 | 7/1971 | Tomaszewski et al. | 340/172.5 |
| 3,678,483 | 7/1972 | Bartocci | 340/172.5 |
| 3,733,588 | 5/1973 | Conn | 340/172.5 |
| 3,760,375 | 9/1973 | Irwin et al. | 340/172.5 |
| 3,778,778 | 12/1973 | Ragen | 340/172.5 |
| 3,781,816 | 12/1973 | Coleman et al. | 340/172.5 |
| 3,781,820 | 12/1973 | Cochran et al. | 340/172.5 |
| 3,810,101 | 5/1974 | Avery | 340/172.5 |
| 3,810,107 | 5/1974 | Goldman | 340/172.5 |
| 3,859,635 | 1/1975 | Watson et al. | 340/172.5 |

*Primary Examiner*—Mark E. Nusbaum
*Attorney, Agent, or Firm*—Staas & Halsey

[57] ABSTRACT

A data gathering and transmitting system includes a portable data gathering device having a keyboard and an input/output connector, each operable for entering data into, and for providing access to data previously entered into, a random access memory. Data as entered is displayed simultaneously; data in memory may be selectively accessed for display by addressed locations and in various automatic scan modes. The portable device thus operates as a true electronic notebook. An interface-formatter located at a remote terminal communicates with a computer, and provides for read-out of data from the portable data gathering device and automatic conversion and formatting of the data to a form suitable for direct transmission to the computer, and for print-out of a hard copy of the data. Where a hard copy print-out is not required, a read-out unit may simply transmit the data without formatting to a distant central receiver suitably programmed to receive and interpret the data transmission. Data may also be transmitted from a computer or distant central transmitter to the interface-formatter for entering data into the memory of the electronic notebook via the input-output connector. Thus, data can be loaded into the electronic notebook from a remote computer, the data can be displayed for reference, and field changes and additions can be made to the data. The massaged data can then be transmitted back to the computer.

74 Claims, 27 Drawing Figures

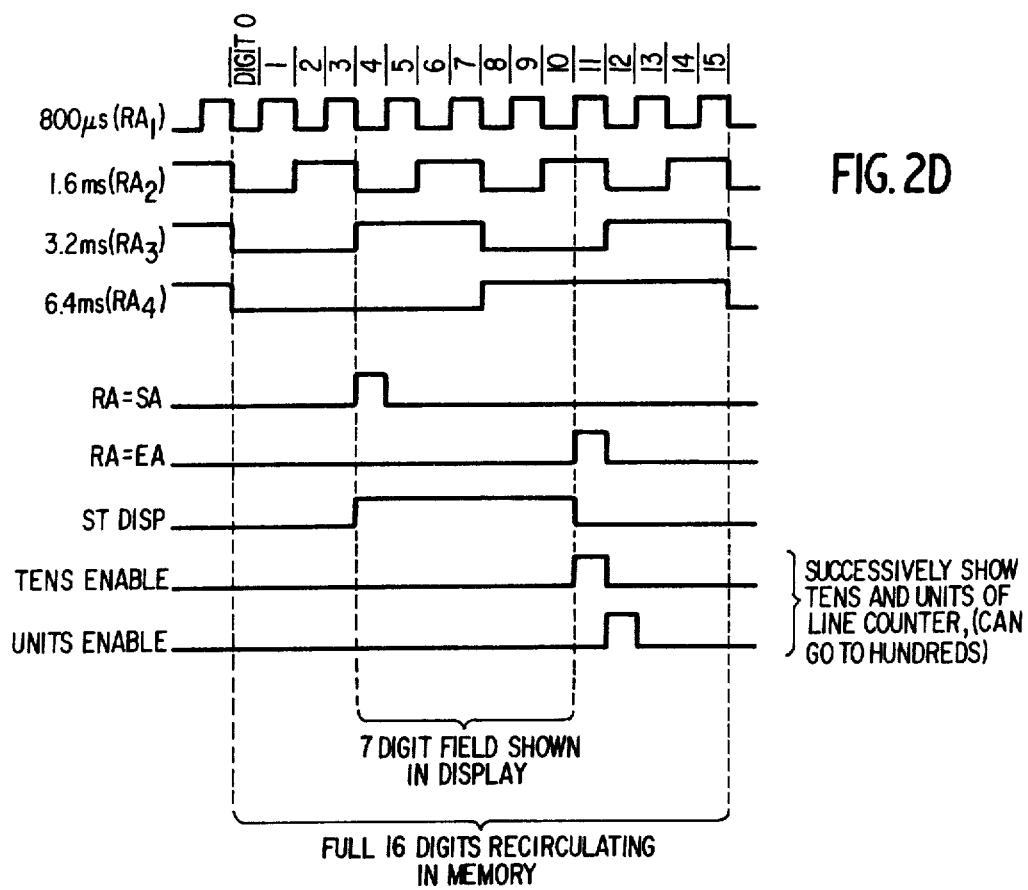
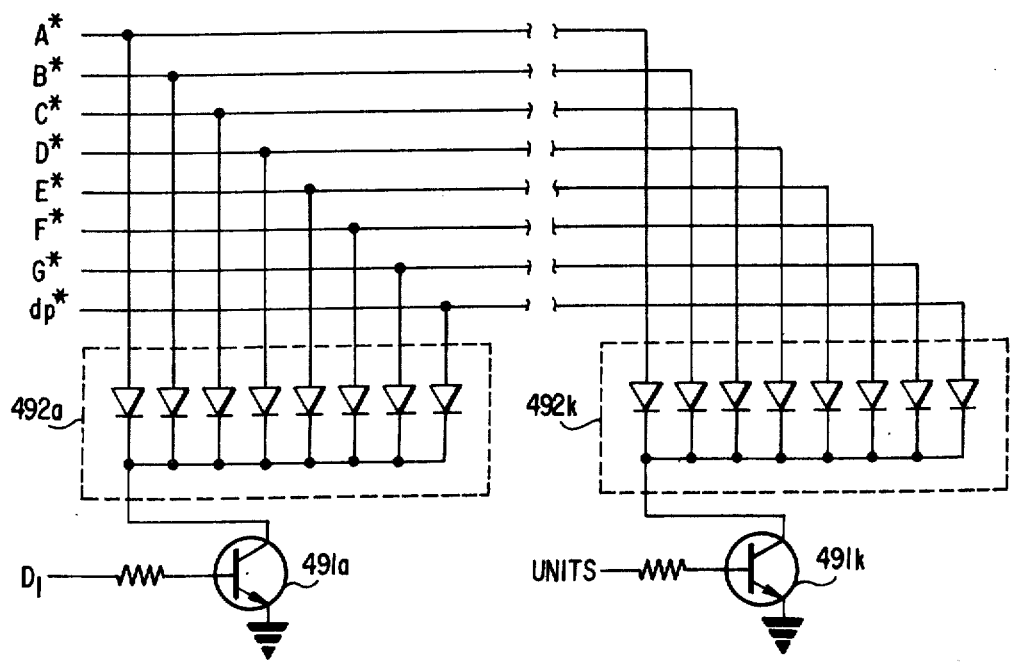

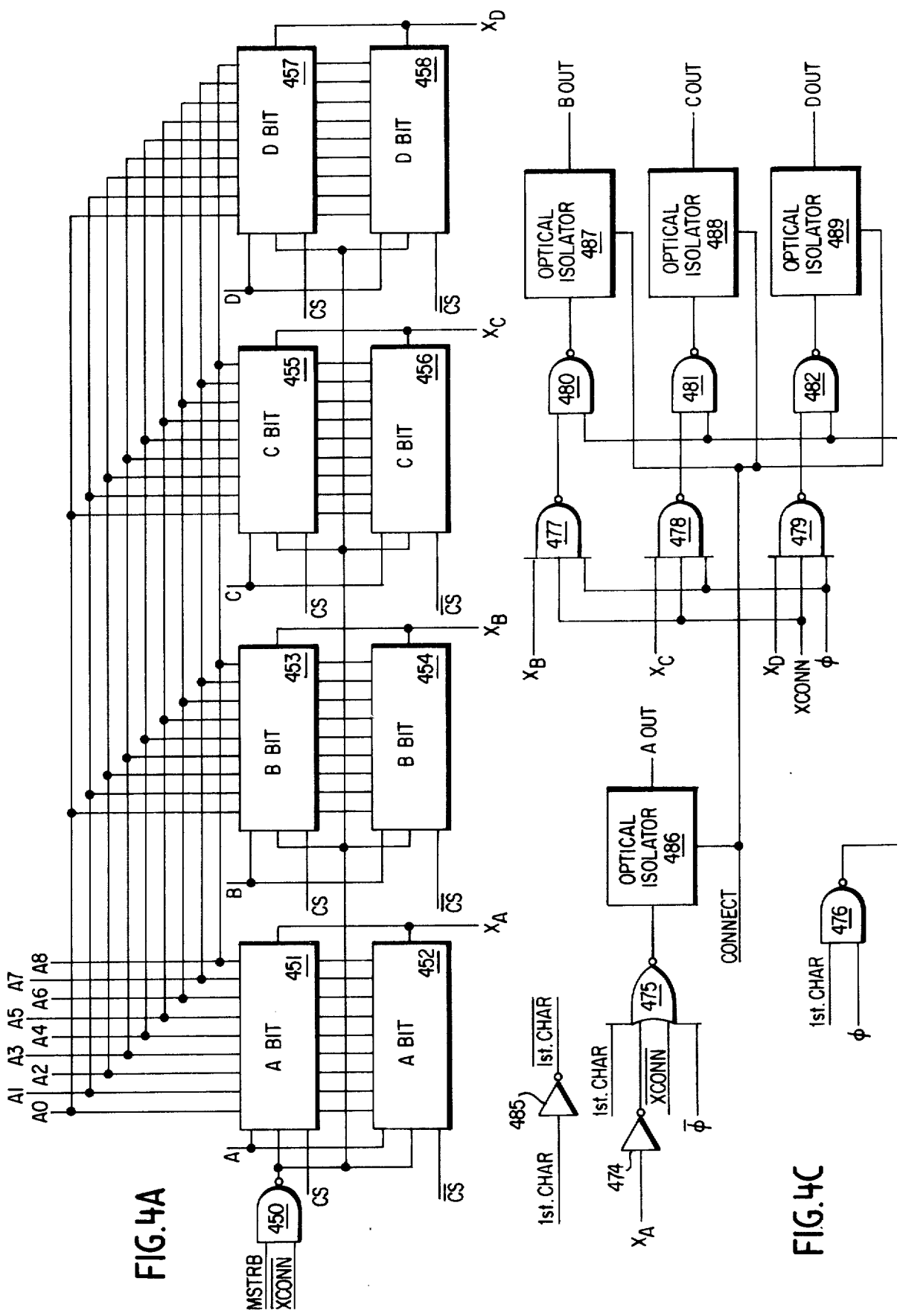

ELECTRONIC NOTEBOOK FOR USE IN DATA GATHERING, FORMATTING AND TRANSMITTING SYSTEM

BACKGROUND OF THE INVENTION

1. Field of the Invention

This invention relates to a data storage and transmission system and, more particularly, to such a system including a hand-held portable device operable as an electronic notebook, for storing a large amount of data, entered manually by keyboard or automatically by transmission through an input/output connector, and which may be read out automatically at a remote terminal for immediate transmission of the data to a distant central procesing system, and/or for storing and/or preparing a hard copy data print-out at the remote terminal.

2. State of the Prior Art

In the prior art, the collection or gathering of data, particularly from remote locations for subsequent transmission to a central processing system, presents the problem that the gathered data, at some point in the operation, must be manually translated into computer compatible form. Typically, the data first is recorded manually on special forms which then are taken to a central facility where the data contained thereon must be converted into computer compatible form, usually by keypunching the data onto computer cards. Manual conversion is extremely costly, is a major source of error, and delays the availability of the data for subsequent processing.

Raw material inventory control, as in the forest products industry, requires that each log be measured and recorded, along with several descriptors. The speed of processing the raw materials in this and other industries often exceeds that of processing the collected data, with the result that the raw material is turned ino finished products before the inventory reports are completed. Other applications include re-ordering of goods in grocery stores; monitor station reading for pollution control; meter reading in gas and electric utilities; route sales orders, such as for perishable goods distributors; trouble reporting, such as in police work, highway construction and repair, and telephone and power industries, and data collection in scientific research.

In a typical meter reading application it is required that the meter reader carry information (fixed data) with him related to each stop on his route for that day, including the house number, meter number, previous meter reading, a code for the location of the meter, and warning codes such as for a mad dog. This information can be loaded into the first field of each line of the memory of the electonic notebook from a computer, prior to proceeding on the route. The corresponding line then is displayed in use at each route stop, and the meter reading (variable data) would be entered into a second field. At the end of the collection period, the fixed data and variable data for each meter would be transmitted to the computer.

Portable key-to-magnetic tape devices have gained acceptance in certain areas, such as the grocery retal industry for use in re-ordering inventory, replacing the order forms, mails, and keypunching where the operating environment permits the use of magnetic tape recorders. However, in most applications magnetic tape recording imposes too many constraints. Temperature, shock, water and dust all cause problems to tape recorders. But more importantly, key-to-tape machines do not have the versatility or ease of use to make them widely accepted as electronic notebooks. The size and weight of the tape recorder requires that shoulder straps and slings be used to carry the recorder, and an umbilical cord attaches the recorder to the hand-held keyboard. Further, data recall and random access to data in memory, a "must" for a true electonic notebook, are not possible with magnetic tape memories. A true electronic notebook, such as the present data collection device, must emulate a note pad in versatility, size and weight, else the manmachine interface problem will limit acceptance — as key-to-tape machines have been limited to grocery stores.

Most of the available key-to-tape units wee designed several years ago before many advances in solid state memory technology had occurred. During 1973, some limited feature solid state units have appeared on the market, designed or the grocery store application. They have not be designed as electronic notebooks, but as solid state equivalents to the old magnetic tape units.

Another prior art source data entry means is the optical reader, which reads source data, marked or written on a document directly into a computer. Keypunch and other secondary operation costs asociated with entering data are eliminated. However, optical reading is viable only where certain constraints can be tolerated. For example, the environmental conditions must assure that the documenet will not become wet or dirty so as to case extraneous marks or damage. Operator training in marking the document must be given, and operator consistency must be dependable. Suitable forms must be designed and available. Moreover, greater time is required, since the source documents normally are transported to a central facility for reading and processing. Finally, optical mark reading presents a relatively high error rate, due to character or mark rejections or substitutions.

There is thus a great need for what may be termed an electronic notebook, i.e., a device which has the flexibility and adaptability of receiving and storing the entered data but which avoids the entry of erroneous data and facilitates instead entry of correct data. The device moreover must be capable of rapid and accurate read-out of the data for subsequent storage and/or processing and avoiding manual conversion.

In general, any process where data is collected manually in the field and later entered into a computer, is a potential application for the present invention. The term "electronic notebook" concisely describes the range of applications.

SUMMARY OF THE INVENTION

The present invention overcomes these and other inadequacies and deficiencies of prior art systems, and offers an economical and accurate means of performing data gathering operations and entering the gathered data into a computer without the necessity of additional human operations. Particularly, the present invention provides for simplified and highly efficient gathering of data, even in remote locations, and includes a hand-held, portable keyboard-to-memory data terminal for collecting data in the field and electronically storing the data in an efficient manner for later read-out. An interface-formatter provides for automatic conversion of the data to a format which is computer compatible, and suitable for transmission directly to a computer and/or for local print-out of a hard copy of the data as well as local storage (e.g., magnetic tape).

In a preferred embodiment, numeric data is entered into the collection device by a keyboard. A large amount of storage is provided in the collection device to permit its use over a desired duration, e.g. a day or longer, whereupon the data stored in the data collection device must be retrieved and the device cleared for further collection purposes. A significant aspect of the read-out from the collection device into the interface-formatter is that manual transcription and formatting are eliminated, thus avoiding such costly functions as manual compilation, transcription, keypunching and verification as are involved in the typical prior art systems. The present invention may be viewed as a general purpose data entry system applicable to a broad range of industries and applications.

The present system satisfies a need for data collection and input, both for end users with in-house computers and for time-shared computer users, and for communications in the computer industry in general — i.e., the need of speeding up data entry.

More particularly, the data collection device is a hand-held, battery powered, keyboard-to-memory device for entering and storing numeric source data for later transmission to a computer. Source data is entered manually by actuating keys of a keyboard. The data is stored in a solid state memory and simultaneously displayed via a light emitting diode display where it can be checked for accuracy. If an error is detected in an entry, the erroneous data is easily eraseed and re-entered, by character. Subsequent data is entered in the same fashion.

During data collection, the display can be used to view the entire contents of memory, line by line, showing previously entered data, and blanks where no data has been entered. Simple operator controls allow the entry of a character anywhere in memory. The memory is like a page of a notebook — the entire page can be viewed, and data can be added, erased, or corrected anywhere on the page, and all before the "page" is submitted to the computer.

The display shows the line number (0 to 99) and the data corresponding to that line. The number of characters in a line is programmable, up to 32. The line can be broken into four fields or less, programmable to conform to the format of data collection. Each field can be up to nine characters. Thus, similar to designing a paper form with blanks to fill in, the display can be programmed to correspond to a desired format of data collection. Programming is done via a read-only-memory (ROM) diode matrix at the factory to customer specification, and differently programmed ROM's may be substituted in the field.

On the display, a pointer shows where the next character will be entered in a line. The pointer can be moved back and forth across a line, similar to forward spacing or backspacing a typewriter, to enter a character at any location on the line. The display can be rolled backward or forward through memory, line by line, with the data for the corresponding line and field showing. The field of interest on a particular line can be selected via the keyboard. The keyboard also allows a tab to be set, to set the pointer at a selected character location each time a line is rolled forward or backward, similar to the tab on a typewriter.

The dataholder memory can be pre-loaded from a computer or terminal to load selected fields in each line. The computer entered data can then be displayed or modified like keyboard entered data. Thus, fixed data can be carried to the field corresponding to the variable data to be collected..

At the end of a data collection period, the device is attached to a companion formatter which in turn is connected to a communication terminal. On command, the information held in memory is transmitted through the formatter, and into the communication terminal. The communication terminal may be a hard-copy type such as a teletypewriter, or simply a modem such as a dataphone.

The interface-formatter includes appropriate control circuits for interjecting SPACE's, carriage return (CR), and line feeds (LF), at preprogrammed positions in the output data stream. The interface-formatter as well provides the necessary conversion from the parallel character storage of main memory to a serial format for transmission. The formattter, in like manner, includes necessary counting and logic circuits for timing the bits in the output bit stream, for counting the characters in each line of data and determining in light of the accumulated count the positions in which to insert SPACE's, for detecting the count of each line and for counting the number of lines to determine the positons for inserting the CR, LF, and like characters.

The interface-formatter provides several output interface; for example, the transmission may be in ASCH code, bit serial, at selectable baud rates form 110 to 1200 baud.

The interface-formatter also provides an input interface to the electronic notebook for receiving transmission from the computer and converting the transmitted data into a form acceptable by the electronic notebook for storing in memory. Receipt of transmitted bit serial ASCII is provided by means of a serial receiver synchronized with the incoming data bit stream to accept and convert the serial bits to parallel-characters. The computer is programmed to transmit the data and controls in the format in which the intended receiving dataholder is programmed. Thus, the data and control signal inputs received from the computer transmission directly simulate the corresponding inputs produced by key actuation. Thus, the appropriate line and field shift control signals are transmitted for entering the "fixed data" into the appropriate preselected lines and fields of the data memory, to enter data in selected fields and lines of the memory.

Where hard copy of the source data must be generated before transmission to a computer, the formatter is capable of arranging the print-out by the hard copy terminal to be of a specified format such as a log scaling ticket, inventory report, or shipping/receiving report. The data remains in memory after the print-out for subsequent print-outs or transmission to a computer, and is cleared only on direct command.

BRIEF DESCRIPTION OF THE DRAWINGS

FIG. 4A illustrates the memory components and the addressing, enabling and control inputs and data input and output connections, of the portable dataholder device;

FIGS. 4B and 4C illustrate the circuits providing communication between the dataholder device and the interface formatter;

DETAILED DESCRIPTION OF THE INVENTION

To facilitate an understanding of the detailed circuit schematics, it is convenient first to describe the organization of the memory and the nature of data entry into the memory.

The memory is of the solid state random access (RAM) type; it may be of any desired size, and as an exemplary embodiment, is disclosed as having a capacity of 32 lines, with 32 digit positions per line. Each line is divided into a number of fields, shown herein as a maximum of four fields, with a maximum number of characters per field, again illustratively shown herein to be nine. The only entries into memory are the source data items, i.e., in the present application, one of the digits 1 to 9 and 0, in addition to a clear code. Hence, a maximum packing density of the stored data is accomplished, the necessary identifying and control digits being generated and inserted at proper positions in the data stream as the memory is subsequently read out by appropriate control circuits to be described.

As before noted, the portable device affords the functions of a true electronic notebook. As implied thereby, every digit or character position in each field of each line, and each line of plurality of lines, is selectively addressable by a number of different techniques or operating modes designed to simulate normal human entry operations in the source data collection while maximizing efficiency and accuracy. The fields of each line therefore correspond to different columns of a data collection sheet wherein similar information, for example, as to each of a number of different items, would be entered in each such column. It is to recognized, however, that the memory itself is not organized into fields but only into lines — the entry of data and its display, however, are performed in relation to the field organization of each line.

Figure 6A:
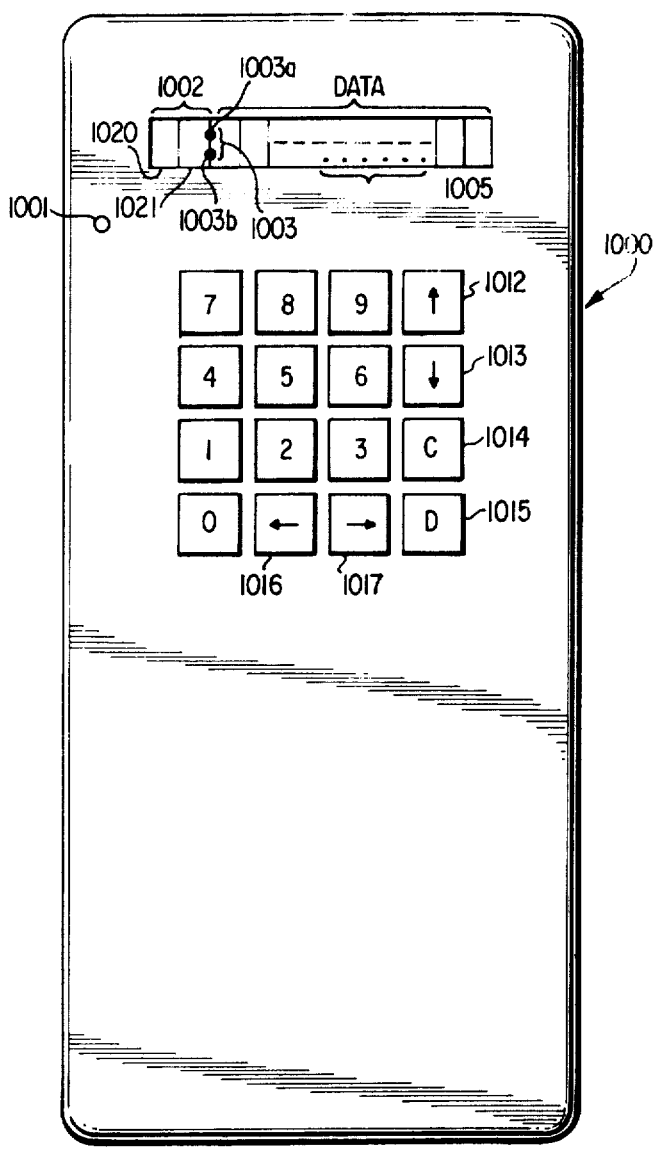
FIGS. 6A and 6B comprise top and side views, the latter partially in cross section, of the structure of the portable dataholder device.

These functions will be more readily appreciated by a brief reference to FIG. 6A which illustrates the portable data collection device 1000. There is provided a keyboard having 16 individually actuatable keys including the numerics $\phi$ through 9 and seven control buttons 1012 through 1017. The buttons 1012 and 1013 having the upward and downward vertical arrows provide for advancing the display forward or moving it backward line by line for each depression or for automatic continuous rolling forward or backward for continued depression. The buttons 1016 and 1017 having horizontal arrows pointed to the left and the right comprise the cursor control, each depression moving the cursor correspondingly to the left or right by one position to change the location of a digit entry. The cursor affords a tab setting function, each new character being entered at the position at which the cursor is set; the cursor may maintain the tab setting for successive line changes, as well. The C button 1014 has a dual function, one being to clear the position currently indicated by the cursor. The D button is the field display control and changes the field shown on the display; moreover, holding the D button down for 1 second provides automatic scan of the memory, thereafter terminated by depressing the clear C button (i.e., the second of its dual functions). The display 1002 shows the line number and the corresponding data for that line and field. The cursor is displayed to indicate the next digit entry position, i.e., that to the left of the cursor. The cursor moves automatically for each digit entry and, as noted, can be moved independently by the cursor control buttons 1016 and 1017, and automtically tabbed.

The display 1002 includes two digit positions, 1020 and 1021, identifying the number of a line being displayed, a field indicator 1003, and nine character positions of data. The field indicator 1003 more specifically includes a top element 1003a which is illuminated to indicate that the first field is currently available, either for data entry or that data currently being displayed is from that field, and a second, bottom element 1003b providing the same indication as to the second field. The top indicator 1003a is made to blink to indicate the third field and the bottom indicator 1003b, when blinking, similarly indicates the fourth field. A cursor indicator 1005 is provided at each digit position and when illuminated indicates the digit position currently available for data entry, erasure, or re-entry. For correction, a digit may be entered directly, automatically clearing the previous digit entry. The decimal point indicator of a standard numeric display element conveniently affords the cursor indicator. Moreoever, when battery power is low, the cursor indicators at all digit positions blink continuously.

In operation, and in a manner to be described, the device is initiated to place a blank or clear code into all positons in memory. Line 1 and field position 1 are made available and the cursor is automatically positioned for the first digit position. As each new digit is entered, the cursor automatically advances to the successive digit position. The cursor also can be moved under direct control, and without modifying existing data, by means of the cursor control buttons.

In a particular application of the device wherein it is desired to enter only two fields of data per line in a normal operation, when the first field is completed and the control button D depressed, the system advances automatically to the second successive field. If the segmented or open field button 1001 has also been depressed, the two additional fields are opened and depression of the button D then serves to advance to each of the third and fourth fields. Those extra fields are closed again for each new line advance.

In either case, when a given field is full, any further data key actuation will not result in entry of the digit into memory, until the new field is made available by depressing D. Further, when the last field (either field 2 or field 4) is completed, the forward key 1013 must be depressed to advance to a new line — i.e., further actuation of D will result only in recycling to the first field of the line. For an automatic scan operation, the button D is depressed for a longer preset period of approximately 1 second, resulting in the device automatically scanning through all fields in succession for each line in succession. Automatic scan is terminated by depressing the C button.

The segmented mode of operation facilitates the man-machine interface in that the operator must intentionally advance into the open field mode as an overt act, in the absence of which the device blocks further data entries when the pre-programmed number of fields in a given line are completed.

The buttons 1013 and 1012 provide for advancing through memory in a corresponding forward or backward direction, line by line, for each depression or for automatically and continuously advancing if the corresponding button is continuously depressed. The same corresponding field in each successive line is displayed in this operation. The line by line advance or backward scan from memory terminates upon release of the key; continued depression of the backward key returns the memory to the first line, i.e., line 01.

Figure 1A:
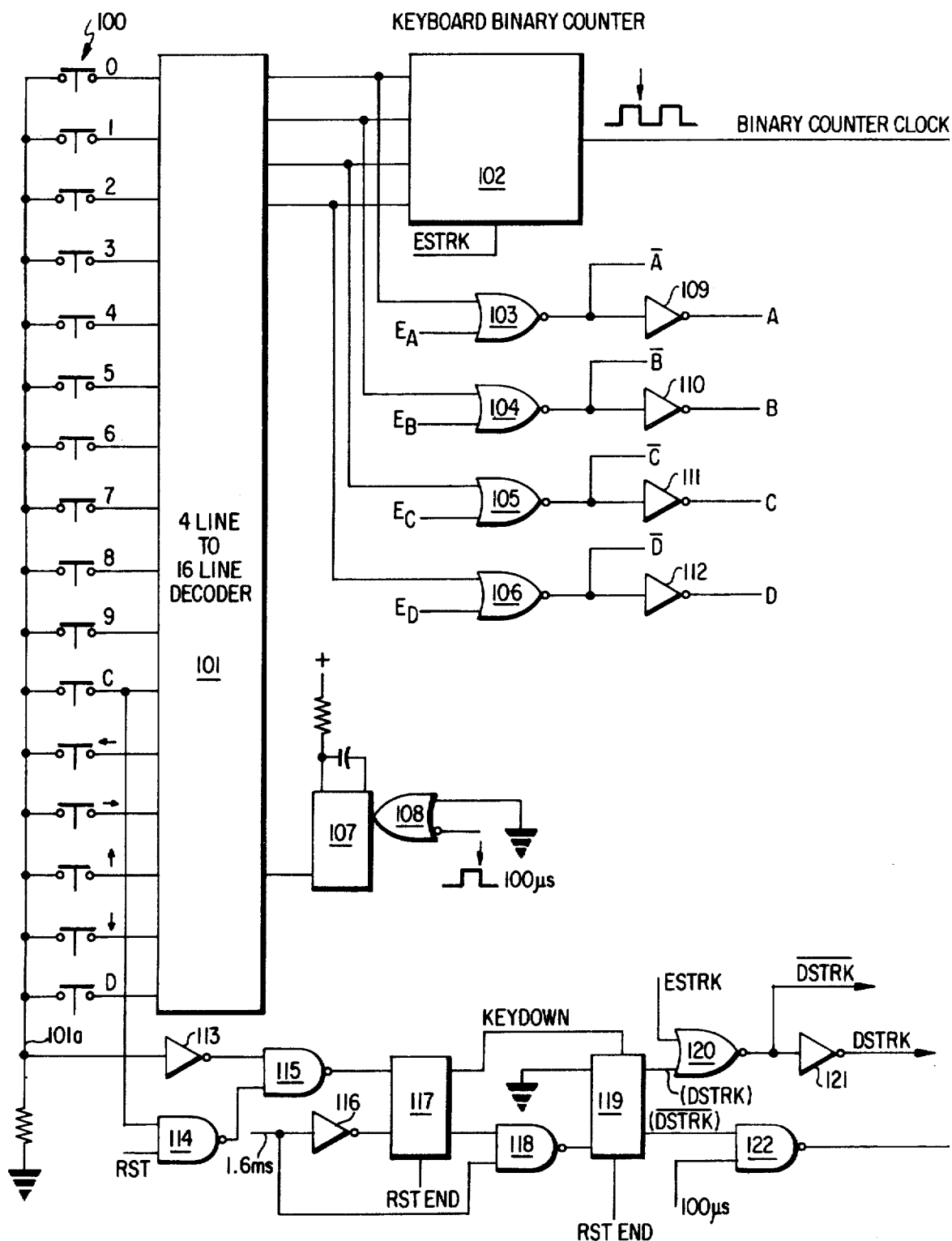
FIGS. 1A through 1D comprise schematics of, and FIG. 1E comprises a timing diagram for, the keyboard entry portion of the portable data gathering device of the invention.
Figure 1B:
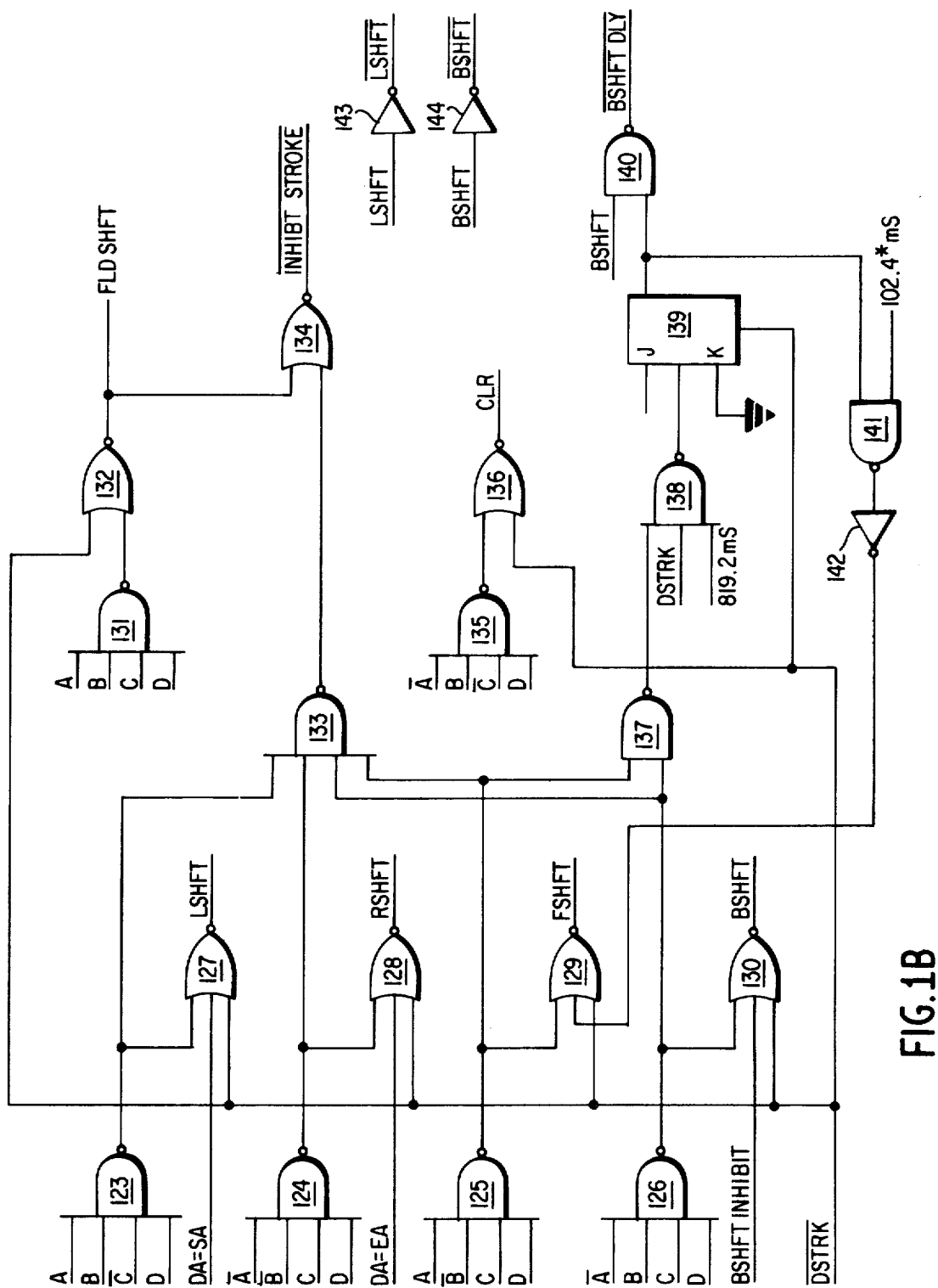
Figure 1C:
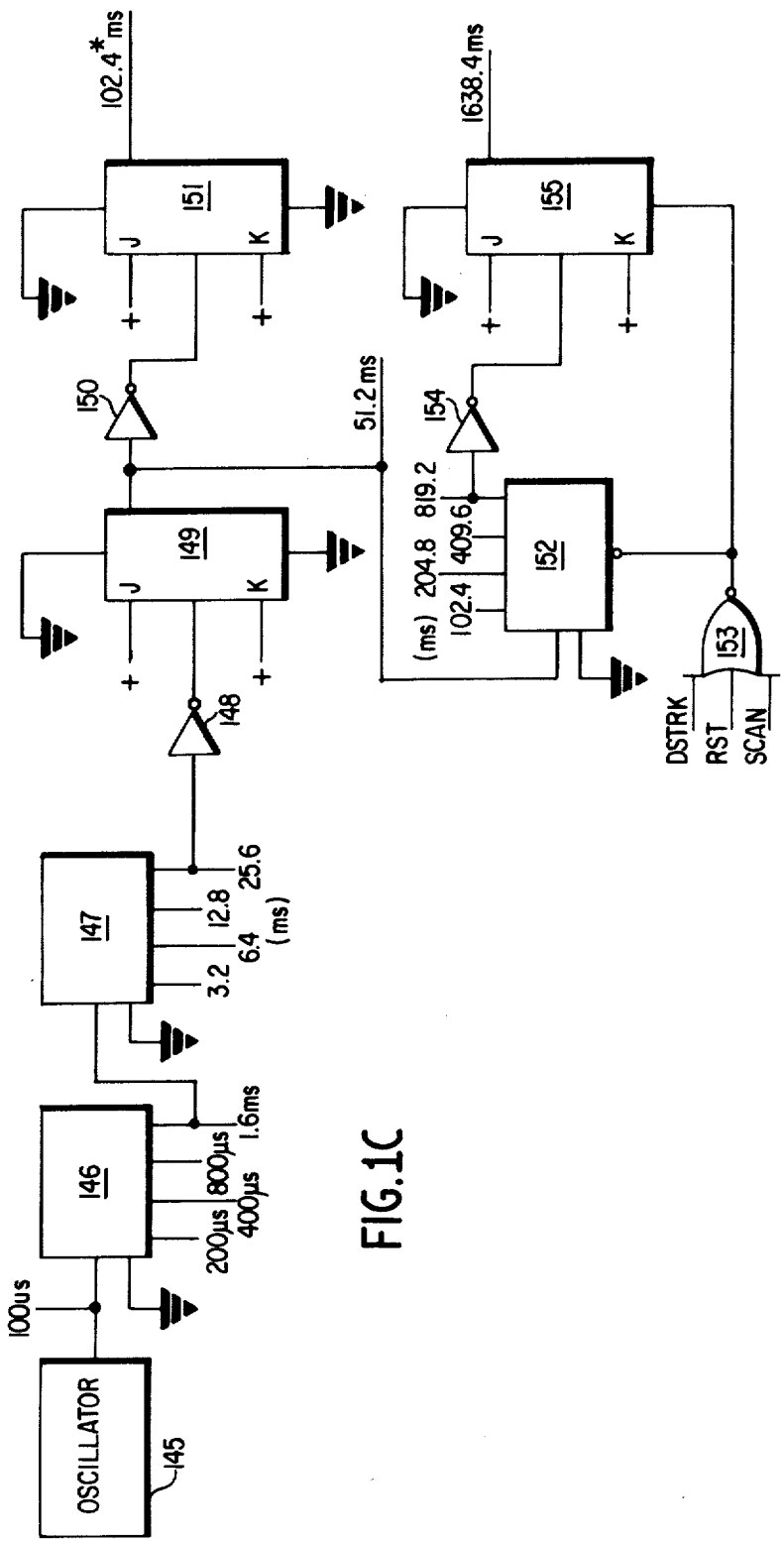
Figure 1D:
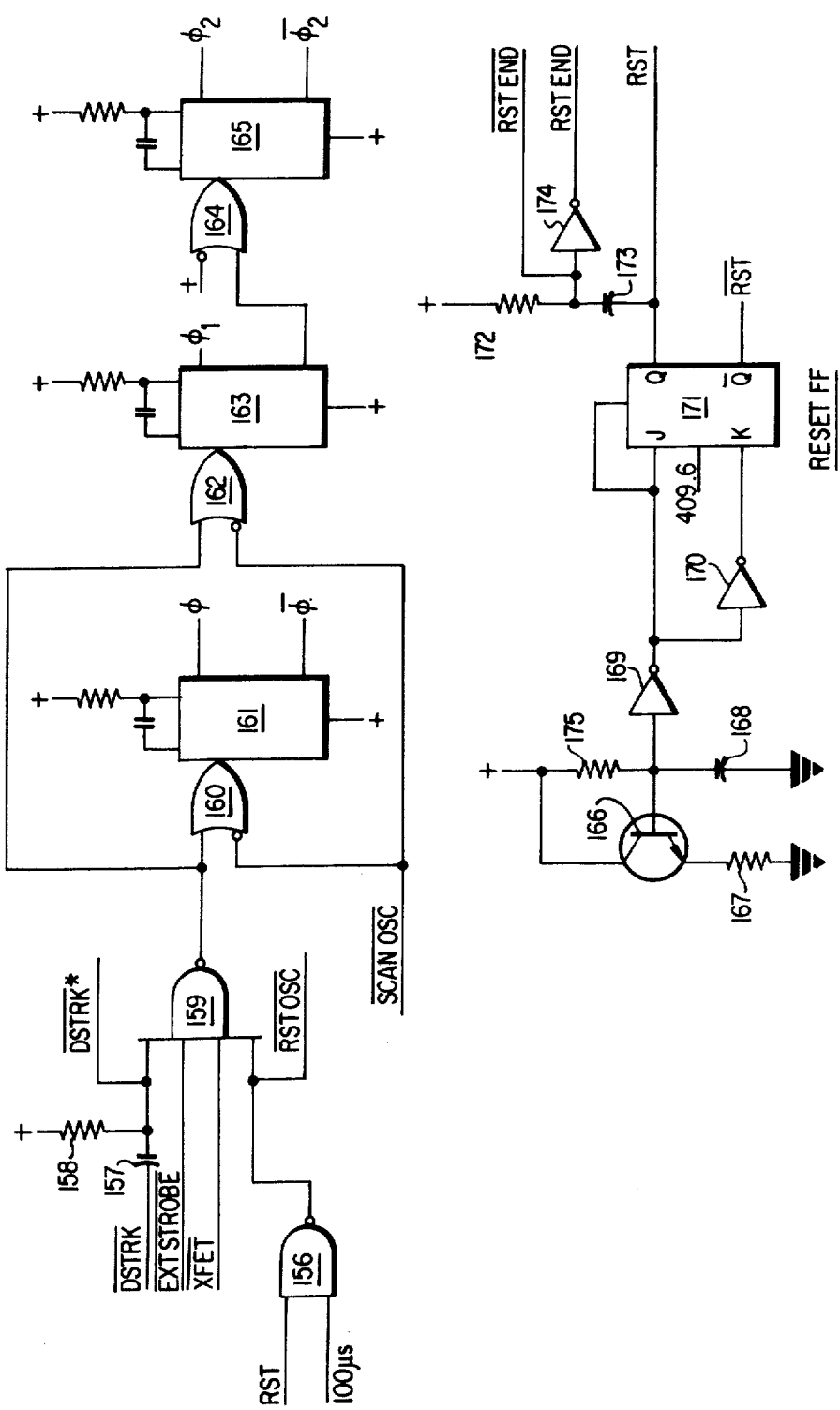
Figure 1E:
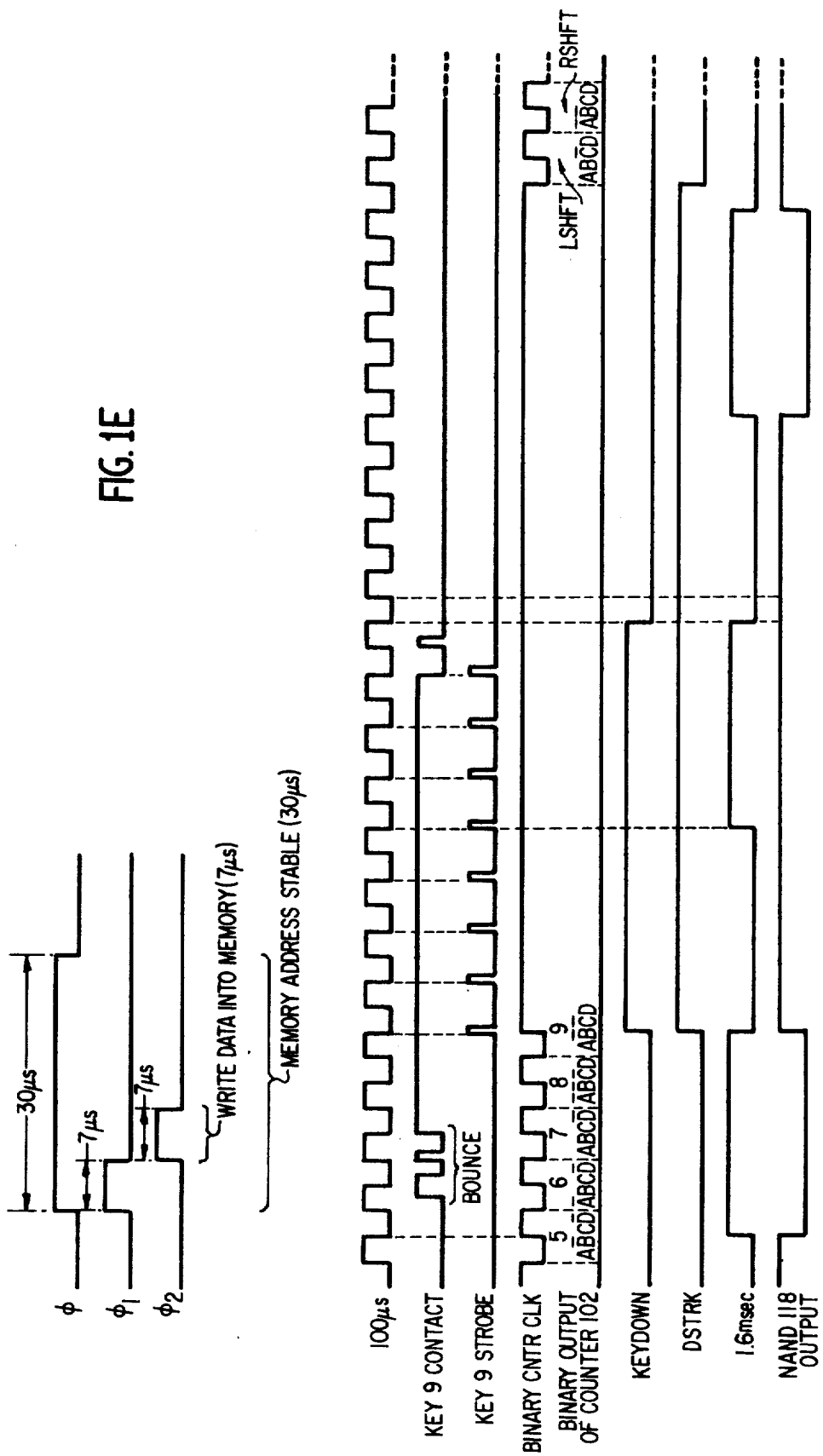

In light of this general discussion of the organization of the memory and the input controls in the data collection device, reference is now had to the detailed schematics of the device and initially FIGS. 1A through 1D which show the schematics, and FIG. 1E which shows a timing diagram for the keyboard entry portion of the device.

In FIG. 1A, the keyboard 100 includes sixteen switch contacts, corresponding to the 16 numeric and control input keys of the device. The switches are connected to corresponding outputs of a 4-line to 16-line decoder 101 which scans, or enables, the 16 switch contacts of the keyboard in sequence. Decoder 101 is driven by the 4 bit binary output of binary counter 102, which receives a 100 $\mu$ sec. pulse train from NAND gate 122. Decoder 101 thus performs a 16 bit time multiplex scan of the key switches; for example, if key 9 is depressed, the contact closure will be detected at the nine count of counter 102.

When a key is depressed, logic 1 on the keyboard common line 101a operates through inverter 113, and NAND 115 to set flip-flop 117, which in turn sets flip-flop 119. There results a 0 disabling input to NAND 122, and the 100 $\mu$ sec. pulse train no longer increments binary counter 102. Binary counter 102 thereby is latched at the binary count corresponding to the activated key as long as the selected key remains depressed. The count, and its complement, are also produced at the outputs of inverters 109 through 112 and at the outputs of NOR gates 103 through 106, respectively. The 100 $\mu$ sec. pulse is inverted by NOR gate 108 to trigger one-shot 107 in order to shift the output of binary counter 102 to the output of decoder 101 at a time when the output of counter 102 is not in a transient condition. Thus, it will be seen that the binary counter 102 is latched at an output 4 bit binary output value corresponding to the key which has been depressed. These four bits are provided as the bits A through D and their complements. The inputs $E_A$ through $E_D$ to NOR gates 103 to 106 are external 4-bit entries made through a connector on the unit simulating the binary code from counter 102; ESTRK is an external pulse simulating the DSTRK pulse. These external inputs provide for pre-loading the memory with fixed data which, of course, may be displayed and in relation to which corresponding source data can later be entered.

The foregoing functions are illustrated in FIG. 1E. At some random time in the count cycle, key 9 is depressed, the resulting steady state pulse typically being preceded by transient pulses due to switch bounce. When the binary output of counter 102 reaches a 9 count, i.e., A $\overline{B}$ $\overline{C}$ $\overline{D}$, the resulting logic 1 output on the 9 line from decoder 101 results in setting of flip-flop 117 to produce the KEYDOWN pulse and setting of flip-flop 119 to produce the DSTRK pulse thereby disabling NAND gate 122 and terminating the train of binary CNTRCLK pulses. When the key is released, the output of NAND gate 115 falls to 0. The next occurring 1 to 0 transition of the 1.6 m sec. pulse train, through inverter 116, resets flip-flop 117 and terminates the KEYDOWN pulse. The next occurring 1 to 0 transition of the 1.6m sec. pulse train, through NAND gate 118, resets flip-flop 119 thereby terminating the DSTRK pulse. In FIG. 1A, $\overline{DSTRK}$ thus becomes logic 1 to enable NAND 122 to resume gating the binary CNTRCLK to counter 102 to resume the count. Thus, a DSTRK pulse is produced for each data entry and is maintained throughout the duration of key depression and for a time of at least 1.6 m sec. following key release. The 1.6 m sec. time period allows the maximum bounce time of the contacts, 1.0 m sec., to be logically filtered out.

The C (Clear) button results in a clear code 0101 ($\overline{A}$ B $\overline{C}$ D) for writing into memory at the currently available digit position. However, when RST (reset) exists, as automatically provided at initial power-on for a period in excess of the memory cycle time (409.6 m sec.), NAND 114 detects RST and C and latches counter 102 to the "clear" code thereby entering 0101 into all locations in memory.

FIG. 1B shows the circuits for translating the 4-bit counter code outputs generated in response to actuation of the control keys, to specific function lines. For example, when the left cursor pushbutton on keyboard 100 is activated, a 0010 code is produced at the output of binary counter 102. This code is detected by NAND gate 123 to produce an LSHFT pulse at the output of NOR gate 127 if DA = SA and $\overline{DSTRK}$ are both zero. As will be explained, a ROM, e.g. a diode matrix read-only memory, is pre-programmed for each data holder device to define the start address (SA) and end address (EA) for each of the four fields of each line, in common as to all lines. For convenience, a 4-bit binary code identifies these start and end addresses, permitting a total of 16 digit positions for two fields; a further signal termed "2nd 16" may be programmed for a given line to provide 32 characters instead of 16. The digit address (DA) in each field therefore must fall within the SA and EA for that field.

Accordingly, NOR gate 127 generates LSHFT for each $\overline{DSTRK}$ as long as DA does not equal SA. When DA equals SA, the digit address has returned to the start address, the equality of the input DA = SA is true producing a logic 1 which disables NOR gate 127 and terminates further generation of LSHFT pulses to prevent the cursor from being shifted off the left edge of the display. The similar observations hold as to generation of RSHFT pulses by NOR gate 128 in relation to the condition DA = EA, i.e. to prevennt the cursor from being shifted off the right edge of the display.

Additional function signals are produced by logic decoding NOR gates 124 through 126, NOR gates 128 through 130, NAND gates 131 and 135, and NOR gates 132 and 136, as shown. With the exception of the CLR signal, inhibiting means prevent the codes for the special signals from being entered into memory. The outputs of NAND gates 123 through 126 are connected to the input of NAND gate 133. Thus, whenever one of the control keys is activated, the output of NAND gate 133 will be 1, thereby producing a 0 at the $\overline{\text{INHBT STROKE}}$ output of NOR gate 134. Similarly, actuating the D pushbutton produces 0 at the output of NAND gate 131 and a 1 at the FLDSHFT output of NOR gate 132 (if $\overline{\text{DSTRK}}$ is 0) and 0 at the $\overline{\text{INHBT STROKE}}$ output of NOR gate 134. Inverters 143 and 144 invert LSHFT and BSHFT, respectively.

To accomplish the forward and back line "roll" or scan through memory, the corresponding forward-shift or back-shift key is pressed for longer than 819.2 m sec.; corresponding to the decoded outputs of NAND gates 125 and 126, supplied through NAND gate 137 to NAND 138, the latter also receiving the 819.2 m sec. clock, result in setting flip-flop 139, thereby enabling NAND gates 140 and 141. The 102.4 m sec. clock pulse train, through NAND gate 141 and inverter 142 produces a series of FSHFT (i. e., line forward shift) pulses at the output of NOR gate 129, each incrementing the memory address by one line. Thus, whereas momentary depression of the forward shift key advances one line, holding it down for 819.2 m sec. or longer causes the memory address to advance one line every 102.4 m sec. for as long as the forward shift key is held down. Alternatively, if BSHFT is 1 for 819.2 m sec. or longer, NAND 140 is disabled by the set output of flip-flop 139 and outputs a 0 for $\overline{\text{BSHFTDLY}}$ which remains as long as the back-shift key is depressed. For each BSHFT pulse, the memory address will be decremented one line. If the back-shift key is depressed for at least 819.2 m sec., a negative-going $\overline{\text{BSHFTDLY}}$ delay pulse will cause the memory address to be reset back to line 01.

If the D pushbutton is depressed, a FLDSHFT pulse occurs to advance to the next data field. If the last data field in a given line is being accessed when D is pressed, the system merely cycles back to the first data field in the same line (advance to a successive line requires instead, actuation of the forward line shift button). Depressing D for longer than 819.2 m sec. alternatively places the data holder in the automatic scan mode.

The oscillator and timing circuits are contained in FIG. 1C. Oscillator 145 produces a 100 m sec. pulse train which is divided down by counters 146 and 147. The 25.6 m sec. pulse train from the output of counter 147 is inverted by inverter 148 and toggles flip-flop 149 to produce a 51.2 m sec. pulse train which is inverted by inverter 150 to toggle flip-flop 151 to produce a 102.4 m sec. pulse train. The 51.2 m sec. pulse train is also divided by counter 152 whenever any of the inputs to NOR gate 153 rises to 1. The 819.2 m sec. output from counter 152 is inverted by inverter 154 to toggle flip-flop 155 to produce a 1638.4 m sec. pulse train. Counter 152 and flip-flop 155 thus function as a gated oscillator.

The initial reset circuitry and the synchronizers for writing data into memory are found in FIG. 1D. The initial reset circuitry is used to reset the line and digit counters to the first memory location, reset the tabulators, and to fill the entire memory with a clear code (0101). In this regard, it is noted that clearing the entire memory is performed by at least momentarily turning off the system power, thereby to activate the reset circuits. At power-up, the voltage at the base of transistor 166 is initially 0, and through inverter 169, sets flip-flop 171 thereby making RST 1. Capacitor 168 begins to charge through resistor 175, and when the voltage reaches the transition level of inverter 169, its output falls to 0, thereby placing a 1 at the K input to flip-flop 171. On the next 0 to 1 transition of the 409.6 m sec. pulse train, flip-flop 171 is reset. The negative-going transition at the Q output of flip-flop 171 is coupled to inverter 174 to produce the RSTEND pulse. Flip-flop 171 thus outputs RST for at least 409.6 m sec. prior to RSTEND thereby to allow sufficient time for the memory to be cycled through each address and a CLEAR code (0101) to be written into each memory location.

In FIG. 1A, RST enables NAND gate 114; thus, at the time of the C output of decoder 101, the output of NAND gate 114 falls to 0, thereby producing a 1 at the output of NAND gate 115 to set flip-flop 117. Thus, binary counter 102 is locked at the clear code for the duration of RST.

In FIG. 1D, RST also enables NAND 156 to pass the 100 $\mu$ sec. pulse train and produce an $\overline{\text{RST OSC}}$ pulse train. The $\overline{\text{RST OSC}}$ 100 $\mu$ sec. pulse train occurs during the entire RST cycle to enter the clear code into memory.

During data entry, all of the inputs to NAND gate 159 are normally 1. The 1 to 0 transition of the $\overline{\text{DSTRK}}$ pulse, which occurs when a data key is depressed, is coupled through capacitor 157 and gates 159 and 160 to trigger one-shot 161, and through OR gate 162 to trigger one-shot 163.

In FIG. 1D (see also the timing diagram of FIG. 1E), the $\phi$pulse from one-shot 161 lasts for 30 $\mu$ sec., while the $\phi_1$ pulse from one-shot 163 lasts for 7 $\mu$ sec. The trailing edge of the $\phi_1$ pulse triggers one-shot 165 through OR gate 164 to produce a 7 $\mu$ sec. $\phi_2$ pulse. The $\phi_2$ pulse is used to write data into memory. This same sequence also is produced whenever the $\overline{\text{EXT STROBE}}$ falls to 0, or when the $\overline{\text{XFET}}$ falls to 0 during transmission of data from the data holder to the formatter. EXT STROBE falls to 0 when the end of a line is reached, to output an end of line code to the formatter. An $\overline{\text{XFET}}$ pulse occurs each time the formatter transmits a FETCH pulse to the dataholder to request readout and transmission of a new data item (digit) from memory to the formatter — as described more fully later.

The $\phi$, $\phi_1$, $\phi_2$ sequence also is triggered by a $\overline{\text{SCAN OSC}}$ pulse in order to display the data contained in memory in the automatic scan operation.

The memory has a capacity of 1024 characters. Each location in memory is defined by a 10-bit memory address ($A_0$ through $A_8$ and CS). The four least significant bits of the memory address ($A_0$, $A_1$, $A_2$ and $A_3$) and $A_8$ (2nd 16 bit) define the digit address while the remaining bits of the memory address ($A_4$, $A_5$, $A_6$, $A_7$, CS) define the line address. Thus, the memory has a capacity of 32 lines, with a maximum of 32 characters per line.

As noted, each line can contain either two or four data fields. In operation, when the last digit entry of a first field of a line is made, the D button must be depressed to sequence to the next data field. At the end of data entry for the second field, the FWD button must be depressed to sequence to the next line, and the D button must be depressed to sequence back to the first field. Alternatively, if the segmented field (field open) switch is actuated, access is gained to the two additional fields and data entry, field advance and ultimately line advance at the end of the fourth field, are accomplished in the same manner as described above. If desired, all four fields can be made available in each line.

Recall that there are three display modes. In one mode, successive momentary actuations of the D button cause repetitive cycling through only the fields of a given line — normally only the first two fields, but when the field open switch is activated, all four fields are scanned and displayed in succession. In a second mode, for any particular field selected for display, the roll forward and roll back operations display the corresponding field for each of the successively preceding or succeeding lines. In a third mode, the D button is depressed for more than 819.2 m sec., to display each of the four fields in succession, for each line in succession. In automatic read-in and storage through the connector, data entry and its display proceed typically in continuous fashion through the selected number of fields of each line of data, for the totality of the data and in accordance with its programmed format, as supplied.

Figure 2A:
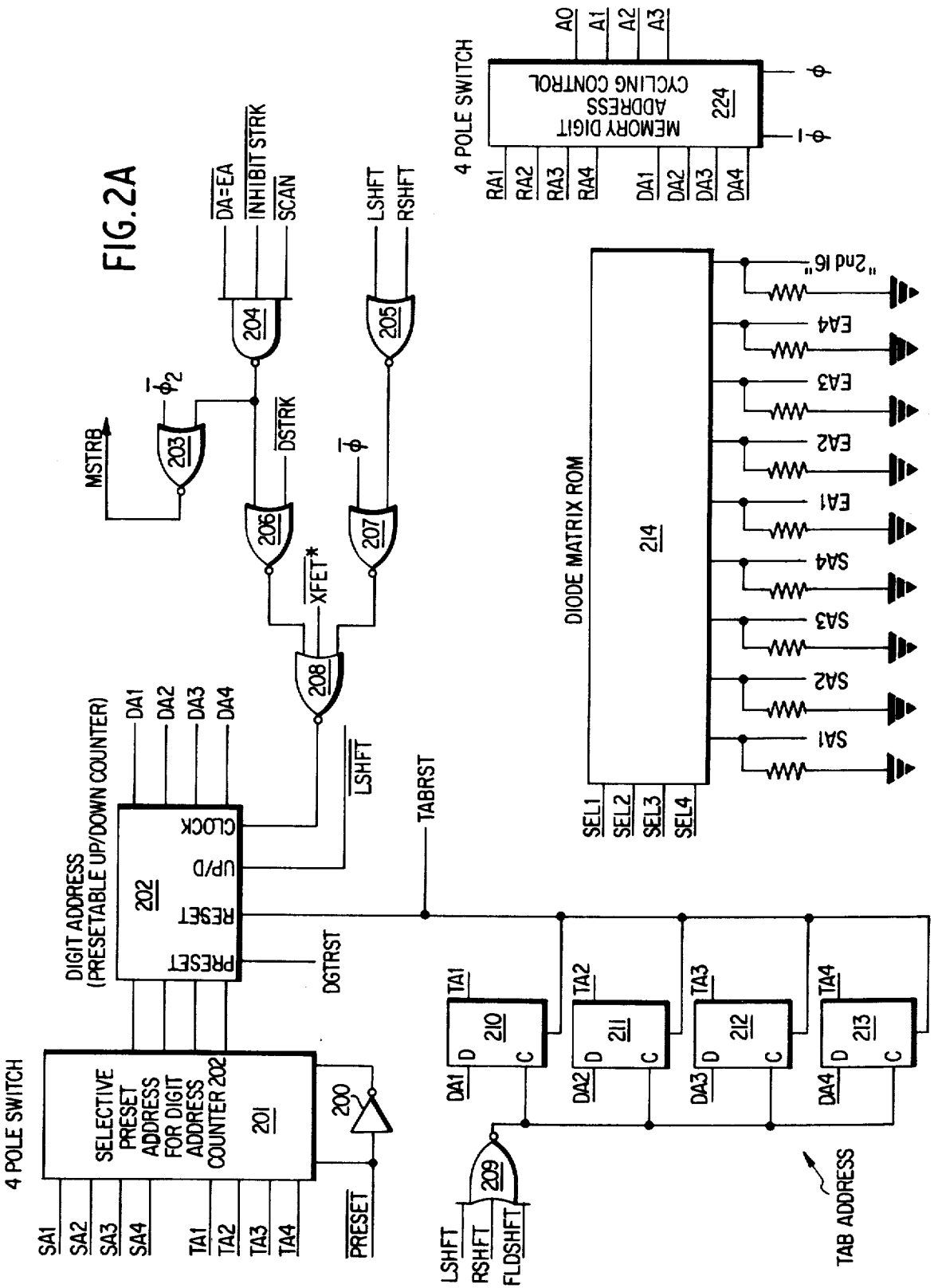
FIGS. 2A through 2C, inclusive, comprise a schematic of, and FIG. 2D comprises a timing chart for facilitating an explanation of, the keyboard entry portion of the portable data gathering device of the invention.
Figure 2B:
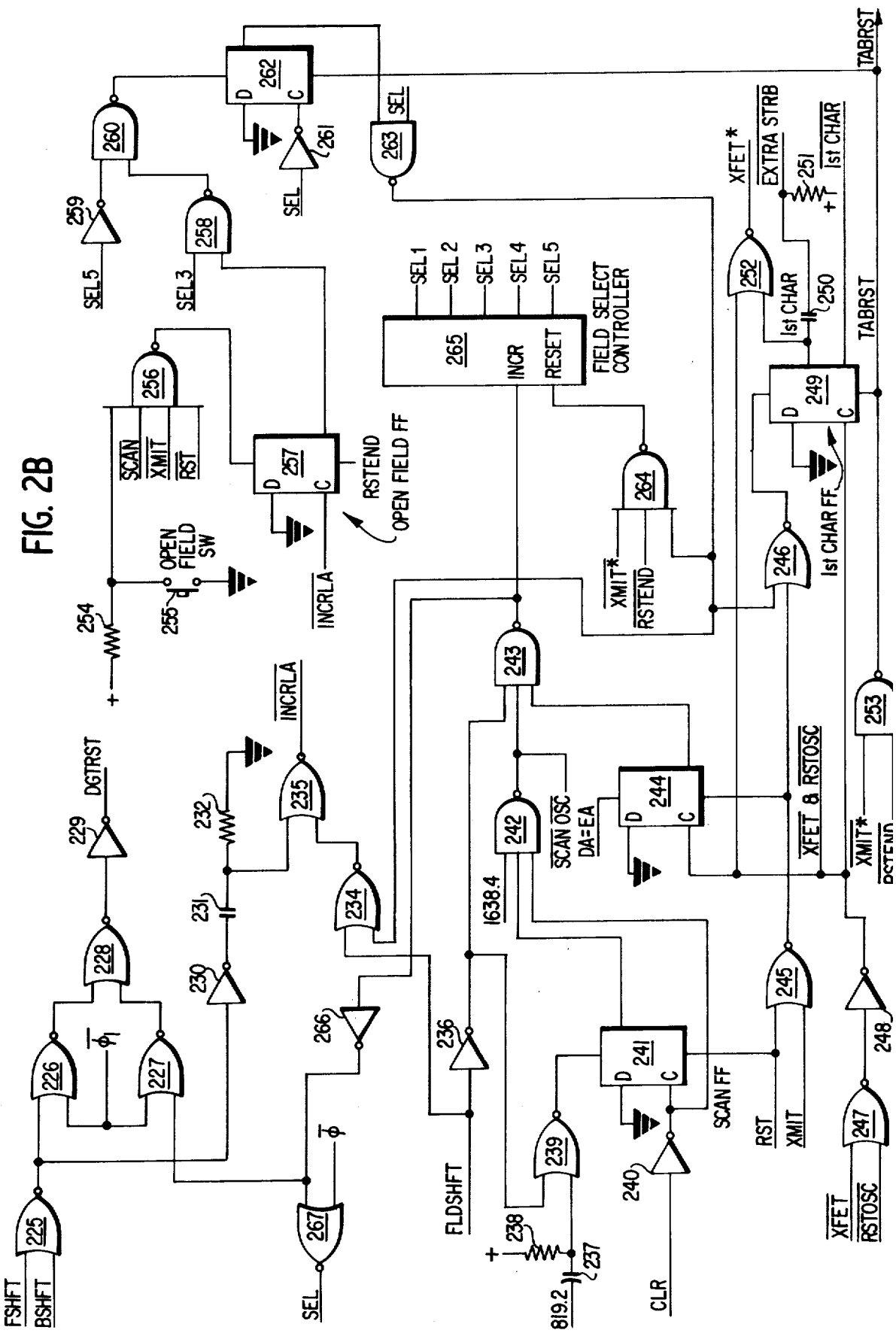
Figure 2C:
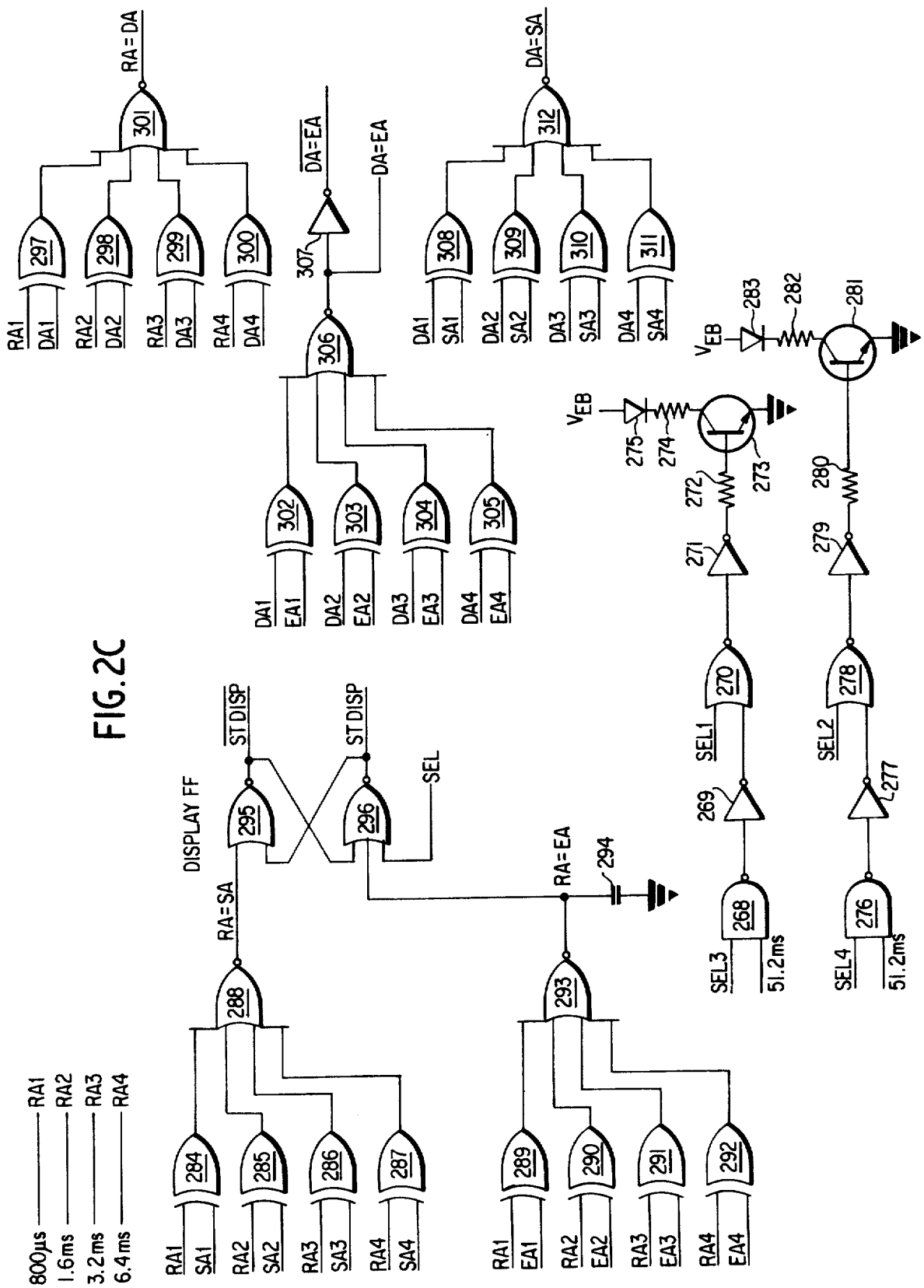

The schematic of the control circuitry is shown in FIGS. 2A through 2C. Digit address counter 202 in FIG. 2A is a presettable binary up-down counter which establishes the digit position in a memory line at which data is to be added. Each time data is entered, the digit address increments up by one count via $\overline{\text{DSTRK}}$ through NOR 206 and NOR 208. The digit address also is incremented selectively up and down by the RSHFT and LSHFT (the cursor key) inputs, respectively, to NOR 205, supplied through NOR 207 (enabled by $\overline{\phi} = 0$ during DSTRK from flip-flop 161, FIG. 1D) and NOR 208. $\overline{\text{LSHFT}}$, of 1 and 0 values, applied to the UP/D input of counter 202 controls incrementing or decrementing of the count, respectively. Thirty $\mu$ seconds after DSTRK, $\overline{\phi}$ returns to 1, and the resulting 0 to 1 transition at the output of NOR 208 then increments digit address counter 202.

NAND 204 prevents DSTRK from incrementing counter 202 under three conditions:

1. "DA = EA" is 0: This means that the digit address is off the data field to the right and therefore the data field is full.
2. "$\overline{\text{INHBT STRK}}$": This indicates that the DSTRK is caused by a control key, and not a data or clear key. This signal is used to prevent the activation of a function key from incrementing digit address counter 202, and from entering the function code into memory.
3. During SCAN, $\overline{\text{DSTRK}}$ will not shift the digit address nor allow access to memory. This is because during the scan mode, data is read out of, but never entered into, memory.

These three conditions also determine when NOR 203 is enabled to produce MSTRB, which controls writing of data into memory.

If none of these conditions is present, the 7 $\mu$ sec. $\overline{\phi}_2$ pulse will enable NOR 203 to output a 7 $\mu$ sec. MSTRB pulse, to write data into the memory.

As later detailed, the "field" definition is very flexible, in that the SA and EA of adjacent fields are essentially independent of each other, i.e., with respect to memory positions, fields may be immediately adjacent with the EA of one directly contiguous the SA of the next, or may be spaced, or may overlap. In the latter case, selected digits (to the extend of overlap) may be displayed both as the concluding digits of one field and as the initial digits of the next.

During read-out of data from the dataholder by the formatter, described in more detail hereafter, the formatter sends a FETCH pulse to request a new character of data to be transmitted, in response to which the dataholder produces XFET. The dataholder then generates XFET* for each XFET, and thus each FETCH, except at the beginning of a new data line, correspondingly to increment digit address counter 202 through NOR 208. XFET* is not generated during the FETCH which occurs at the beginning of a new line to permit the dataholder to transmit an end of line code or tag (a 4-bit word 0111) to the formatter to generate an end of line sequence CR (carriage return), LF (line feed), RO$_1$, RO$_2$ (rub-outs 1 and 2), before a new line of data is read out.

In FIG. 2B, the first character flip-flop 249 controls generation of XFET*, as described; it is set during transmission, or during reset, after the last data field of a line has been selected by the select controller 265. The field end flip-flop 262 detects the next selection after the last programmed data field in a given line and resets the select controller 265 and sets the first character flip-flop 249. For example, during read-out, normally SEL4 at the output of select controller 265 is the last field. When SEL5 becomes 1, field end flip-flop 262 is set through inverter 259 and NAND gate 260. With the field end flip-flop 262 set, SEL occurs simultaneously, and through NAND gate 263 outputs a negative-going pulse which, through NAND 264, resets select controller 265 to SEL1 and, if RST or XMIT is detected by NOR 245, through NOR 246, sets first character flip-flop 249. This disables NOR 252 and inhibits the XFET* pulse. The next occurring FETCH pulse produces a $\overline{\text{XFET}}$ pulse, applied through NAND 247 and inverter 248 to an input of NOR 252; however, NOR 252 is disabled by the 1 output of the now set, first character flip-flop 249, and thus no XFET* output results. This then affords the time for the end of line sequence, above described.

On the trailing edge of the said next occurring $\overline{\text{XFET}}$ pulse, the 0 to 1 transition at the output of inverter 248 resets first character flip-flop 249 and NOR 252 is again enabled. Subsequent $\overline{\text{XFET}}$ pulses then produce corresponding XFET* pulses through NOR 252 to increment digit address counter 202.

During the reset cycle, the $\overline{\text{RSTOSC}}$ pulse train passes through NOR 247, inverter 248 and NOR 252 to produce a series of XFET* pulses to cycle the memory through all address locations and write the clear code (0101) into each location.

The select controller 265 is a binary counter which activates its 8-line outputs sequentially for successive input pulses. It selects the data field shown on the display by its control inputs to the diode matrix ROM 214, which has pre-programmed therein start address codes SA$_1$, SA$_2$, SA$_3$, SA$_4$ and end address codes EA$_1$, EA$_2$, EA$_3$, EA$_4$ for the corresponding fields. Select controller 265 also is reset through NAND gate 264 at the start of a transmission when the $\overline{\text{XMIT*}}$ pulse occurs or at the end of reset when the $\overline{\text{RSTEND}}$ pulse occurs.

At the beginning of transmission and at the end of reset, the digit address counter 202 and line address counters 401 to 404 (FIG 3A) are also reset. Thus, at the beginning of transmission and at the end of reset, the first digit position of the first data field in the first line is available for read-out or data entry.

The memory is normally cycled through 16 positions in accordance with inputs $RA_1$ to $RA_4$ (see FIG. 2A) to a 4 pole switch 224 which normally connects those inputs to its outputs, $A_0$, $A_1$, $A_2$, $A_3$, which are supplied to the digit address lines to the memory (see FIG. 4C). The display is turned on only during a portion of the 16 position cycle. That portion can be as large as 9 digit positions, or as small as 1 digit position. The display is turned on when the Recirculate Address (RA) is equal to the Start Address (SA) via the array of exclusive OR gates 284 to 287 (FIG. 2C). This causes the Display flip-flop 295 to latch to ST DISP. When RA = EA (End Address) the Display flip-flop 295 is turned off, which turns off the display. (See FIGS. 2D and 3C). Whereas the RA inputs define a currently addressed digit position in normal cycling operations, a specific digit position defined by the digit address counter may be selected for data entry or clearing in accordance with switching switch 224 to the $DA_1$ to $DA_4$ inputs. 224 is switched by $\phi$ which is generated during the $\phi$, $\phi_1$, $\phi_2$ sequence described previously.

Thus, the display shows only the digits corresponding to the selected field. Furthermore, only the selected field can be operated upon by the keyboard; the other digit positions in memory are not accessible without changing fields or lines. There can be up to 4 fields to a line of data, each field with a different number of digits. The programming of the fields is accomplished by the Diode Matrix ROM 214 which can be unplugged in the field and a differently programmed ROM inserted. Each ROM is programmed to a desired display format analogous to a desired format of lines and columns of a blank, form or tabulation sheet to be filled in, as in a paper notebook — thus, the analogy of the present invention to an electronic notebook.

Considering the foregoing in more detail, whenever the D pushbutton on keyboard 100 is pressed, a FLDSHFT pulse occurs which changes the field shown in the display. This pulse is inverted by inverter 236 and passes through NAND gate 243 to increment Select Controller 265. Flip-flop 244 is set to increment the select controller 265 during SMIT or RST (detected by NOR 245) and when DA=EA, which signals the end of a field; thus, during read-out (XMIT) the select controller is incremented to the next field upon completion of read-out of a preceding field, and during reset (RST) upon completion of resetting a preceding field. Flip-flop 244 is reset on the trailing edge of either $\overline{XFET}$ or $\overline{RSTOSC}$, through NAND gate 247 and inverter 248.

Figure 3C:
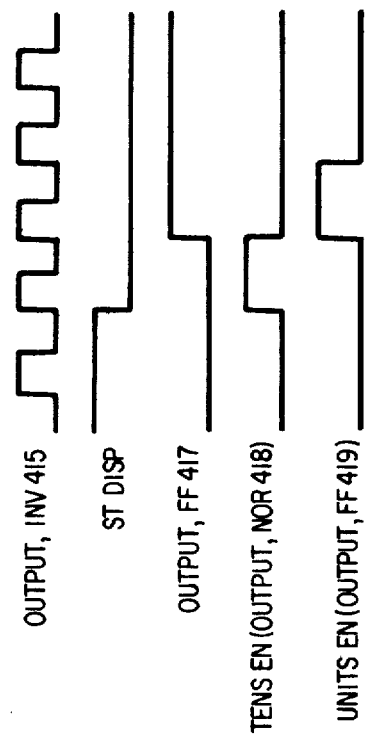
FIGS. 3A, 3B and 3D comprise schematics of, and FIG. 3C comprises a timing chart for explanation of, circuits for responding to the control signals developed primarily by the control circuits in FIGS. 2A through 2C for producing memory addressing signals and display enabling and control signals.
Figure 3A:
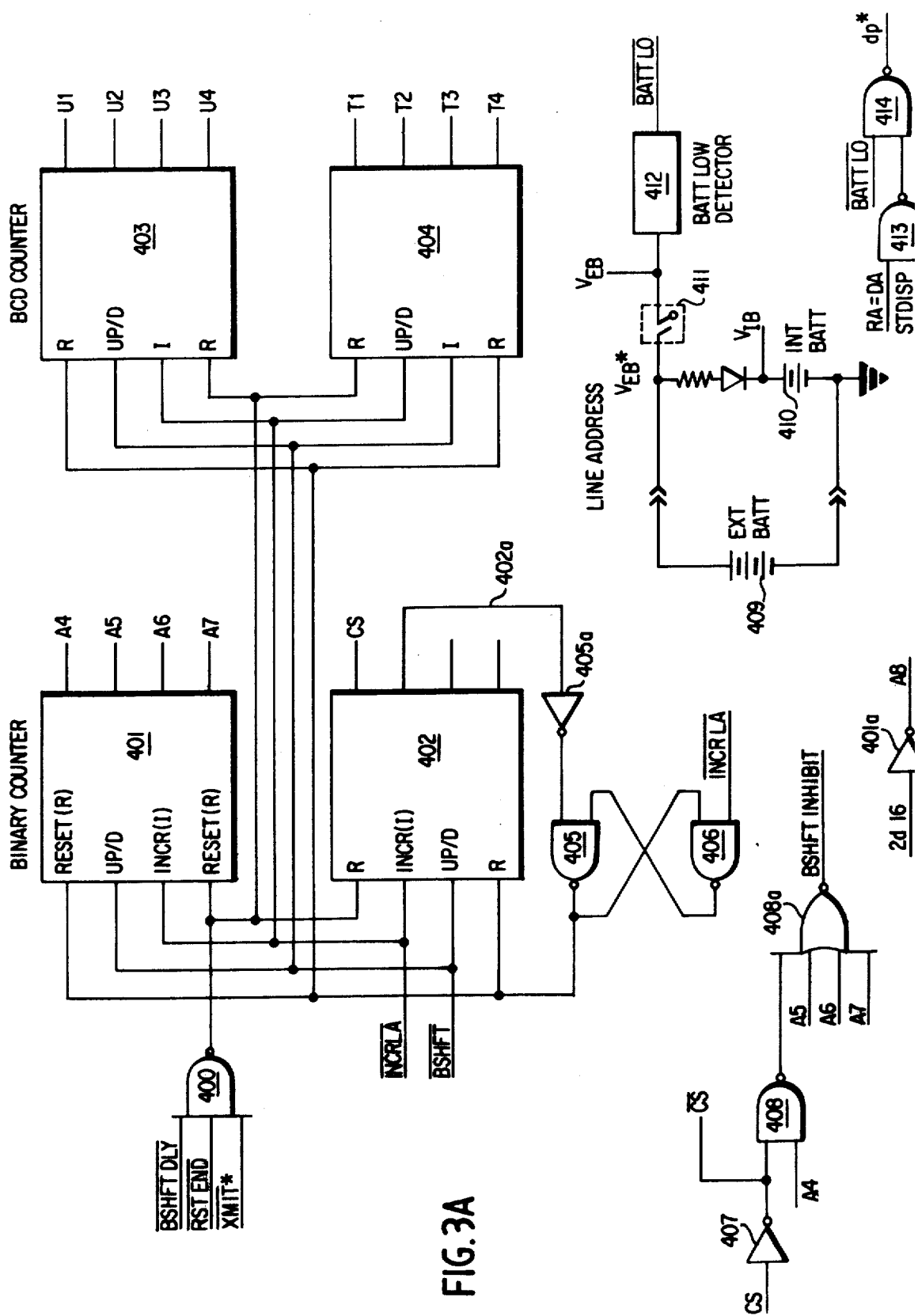

NOR 235 produces an $\overline{INCRLA}$ signal to increment the line address counter (FIG. 3A). The $\overline{INCRLA}$ signal can be produced in two ways: automatically, at the end of the last field if in XMIT or RST; or, by means of the FWD or BKWD keys 1012 and 1013, which cause FSHFT and BSHFT, respectively. If field end flip-flop 262 is set, upon occurrence of SEL, NAND gate 263 produces a signal to NOR 234, which transmits a signal to NOR 235 producing an $\overline{INCRLA}$ if FLDSHFT is false. If FLDSHFT is true, the signal from NOR 234 is inhibited. Thus, an $\overline{INCRLA}$ cannot be produced if FLDSHFT is true, which means that depressing the D key causes cycling through the fields on a single line; the line cannot be changed by the D key. The second way of producing an $\overline{INCRLA}$ is by depressing the FWD or BKWD keys 1012 and 1013 which supplies FSHFT or BSHFT, respectively, to NOR 225. NOR 225 produces a signal through INV 230 which is differentiated by RC 231 and 232 to cause NOR 235 to produce an $\overline{INCRLA}$ pulse.

Digit address counter 202 is preset selectively to either the SA or TA address the outputs of a 4-pole switch 201, by the DGTRST input. The DGTRST signal causes the DIGIT ADDRESS counter to assume the TAB address (TA), each time the FWD or BKWD key is depressed, and to assume the start address (SA) each time the field is changed. The DIGIT ADDRESS locates the cursor on the display and locates the address in memory for data entry or read out. The DGTRST signal occurs during the $\phi_1$ pulse if either NOR gate 226 is enabled by FSHFT or BSHFT being detected by NOR gate 225, or NOR gate 227 is enabled by the occurrence of a select controller increment signal at the output of inverter 266 (FIG. 2B). However, when FSHFT or BSHFT is detected by NOR 225, a $\overline{PRESET}$ signal is sent to the 4-pole switch 201 (FIG. 2A) through inverter 200 to switch the outputs of the 4-pole switch from the start address (SA) to the TAB address (TA). Thus, each time a new data field is selected by activating the D key, the digit address (DA) 202 will be set to the start address (SA) as programmed and stored in diode matrix ROM 214, and each time the FWD or BKWD key is depressed, the DA 202 will be set to the TAB address.

At the start of transmission, a $\overline{XMIT^*}$ pulse is produced and at the end of the reset sequence a $\overline{RSTEND}$ pulse is produced. If either of these signals is detected by NAND gate 253 (FIG. 2B), a TABRST signal is generated which resets the tab address (TA) flip-flops 210 through 213 (FIG. 2A) and sets the digit address counter 202 to zero. The tab address (TA) moreover is set to the digit address (DA) each time a LSHFT, RSHFT, or FLDSHFT signal is detected by NOR gate 209. This mans that each time the cursor is moved left or right via the LEFT or RIGHT shift cursor keys, the TAB address (TA) is set to DIGIT ADDRESS (DA); thus, the cursor comes up at the last position set by the LSHFT or RSHFT keys 1016 and 1017, each time the line is changed via FWD or BKWD keys 1012 and 1013, respectively. This allows the operator to position the cursor, much like setting the tab in a typewriter, to a desired position at which it remains for successive lines. Additionally, each time a new field is selected, the TAB address assumes the DIGIT ADDRESS which is the start address (SA) of the new field. Thus, the TAB is cleared each time the field is changed to keep the cursor from getting lost in another field upon line change.

The dataholder can be placed in a scan mode by holding the D pushbutton on keyboard 100 depressed. During the scan mode, the select controller 265 is automatically incremented to display each field of each line, in succession — such as for verification prior to transmission, or any other desired purpose. When the D pushbutton is held depressed, the FLDSHFT signal is produced and, through inverter 236 and NAND 243, increments the select controller 265. If D is held depressed longer than 819.2 m sec., NOR 239 is enabled on the trailing edge of the concurrent 819.2 m sec. pulse, coupled thereto through capacitor 237, to set the scan flip-flop 241. When flip-flop 241 is set, and the CLR pushbutton is not depressed, NAND gate 242 is enabled so that the 1638.4 m sec. pulse train passes through NAND gate 242 to the input of NAND gate 243. However, as long as the D key is depressed the output of inverter 236 will be 0 disabling NAND gate 243. When the D key is released, NAND gate 243 will transmit the 1638.4 m sec. pulse train to increment select controller 265. This incrementing pulse also is coupled through inverter 266 to NOR 227 to produce, through NOR 228 and inverter 229, a DGTRST pulse. This pulse sets the digit address (DA) of digit address counter 202, through switch 201, to the start address at the output of diode matrix 214, for each new field, and thus each time the field is changed. Thus, as select controller 265 is incremented once every 1638.4 m sec., the digit address is set to the new start address derived from the ROM 214.

At the end of the last field, the Field End FF 262 is set via SEL 5 through inverter 259 and NAND 260 to enable NAND 263. NOR 267 generates SEL upon $\phi$ and SCAN OSC, and SEL in turn is transmitted through the enabled NAND 263 through NOR 234 and through NOR 235 to produce $\overline{INCR\ LA}$. NOR 234 is enabled only when FLDSHFT is not true. Thus, at the end of the last field, when not caused by FLDSHFT, the line counter is automatically incremented to the next line (during SCAN, RST, and XMIT, but not when the D key is depressed.)

The scan mode is terminated by momentarily depressing the CLR pushbutton, which operates through inverter 240 to disable NAND gate 242, and the 0 to 1 transition at its release operating through the inverter 240 to reset the scan flip-flop 241 and thereby disable NAND gate 242.

The dataholder normally utilizes two data fields. As mentioned earlier, field open flip-flop 257 normally is reset and enables NAND gate 258 so that when SEL3 is produced following completion of two fields, field end flip-flop 262 is set through NAND gate 260. However, if four fields are desired, the open field switch 255 of FIG. 2B (button 1001 in FIG. 6A) is depressed, which operates through NAND gate 256 to set the open field flip-flop 257 and disable NAND gate 258. SEL3 therefore is blocked by NAND 258, and field end flip-flop 262 remains set until SEL5, through inverter 259, is detected by NAND gate 260. Thus, when the open field switch is pressed, the field end flip-flop 262 will not be set until select controller 265 has incremented through four data fields. When the FWD or BKWD key thereafter is depressed to change lines, $\overline{INCRLA}$ at the output of NOR 235 resets open field flip-flop 257. Thus, the open field switch opens the two additonal fields for only one line at a time; each time the line is changed, the extra fields are closed, and only two are available normally. The field open flip-flop 257 is also reset, initially, by RSTEND. The alternative of having all fields always available is apparent.

The open field flip-flop 257 also is set during SCAN, XMIT, or RST by the corresponding inputs to NAND 256, to make the additonal fields available during each of these operations; in contrast to the momentary contact input of the open field switch 255, the signal inputs to NAND 256 are steady state and override the $\overline{INCRLA}$ reset function whereby the extra fields remain open for successive lines.

The field indicator 1003 (FIG. 6A) is activated by circuits of FIG. 2C. SEL1 disables NOR 270 and through inverter 271 activates transistor 273 to illuminate the top light emitting diode 275 (1003a). Similarly, SEL 2 causes illumination of the bottom light emitting diode 283 (1003b). If the open field switch 255 is activated to select two additional data fields, SEL 3 enables NAND 268 to pass the 51.2 m sec. pulse train for energizing the top light emitting diode 275 to blink on and off every 52.2 m sec.; similarly, SEL 4 causes blinking illumination of the bottom light emitting diode 283.

The outputs, $A_0$, $A_1$, $A_2$ and $A_3$, of 4-pole switch 224 normally are set to the $RA_1$ through $RA_4$ (Recirculate Address) inputs which continuously cycle through the 16 addresses of a line. FIG. 2D shows the signals from the timing circuits of FIG. 1C which are employed to generate $RA_1$ to $RA_4$ and also the relationship of the data positions of a field, as defined by SA to EA for an illustrative field — both as to the displayed field and correspondingly the digit positions of the field available for data entry or read-out. It will be recalled that the diode matrix ROM 214 provides a "2nd 16" output. "2nd 16" simply acts as one of the memory address bits ($A_8$) to allow access to those memory locations requiring the $A_8$ bit when in certain fields. The $A_8$ bit controls one-half of the memory, thus one-half of the memory is reserved for those fields programmed for "2nd 16". This allows a single line to have access to another 16 digits while using the same 4 bit ($A_0$, $A_1$, $A_2$, $A_3$) memory code for addressing a digit in a line.

When data is read into memory, $\phi$ (FIG. 1D) pulse causes the 4-pole switch 224 (FIG. 2A) to present the address specified by the digit address counter 202 to memory for the 30 microsecond duration of $\phi$. During $\phi$, $\phi_2$ occurs to generate MSTRB at the output of NOR 203 (FIG. 2A) to write data held by the keyboard binary counter 102 into the memory location specified by the digit address counter.

The circuits which identify the decimal point indicator at the digit positions, to be illuminated as the cursor in the display, are also shown in FIG. 2C. Exclusive OR gates 297 through 300 and NOR gates 301 comprise a coincidence detector to produce RA = DA when the recirculate address equal the digit address.

FIG. 2C also shows the circuits which control the digit position shift functions through each field. Exclusive OR gates 302 through 305 and NOR gate 306 comprise a coincidence detector for DA = EA and, through inverter 307, $\overline{DA = EA}$. When DA = EA, data entry is inhibited and RSHFT is inhibited (FIG. 1B) to prevent the cursor from being shifted off the right of the display. This signal also sets flip-flop 244 (FIG. 2B) when in RST or XMIT, automatically to increment the select controller 265 at the end of each field during reset or read-out. Exclusive OR gates 308 through 311 and NOR gate 312 comprise a coincidence detector for DA = SA. When DA = SA, LSHFT is inhibited (FIG. 1B) to keep the cursor from moving off the left side of the display.

The foregoing has described the cycling through digit positions and fields of memory, as well as the generation of $\overline{INCRLA}$ to advance or return through successive lines of memory, and the various scan modes in which line advance or return (line shift) is performed. The circuits for responding to these signals and performing the requisite line selection functions are shown in FIG. 3A.

It will be recalled that the addressed digit positions in a given field are defined by $A_0$ to $A_3$ at the outputs of 4-pole switch 224 in FIG. 2A, as a function of successive DSTRB pulses produced by key actuation (resulting in the $\phi$ sequence) and timing signals producing $RA_1$ to $RA_2$ or in any of the scan or transmit modes (in which the digit address counter produces $DA_1$ to $DA_4$). The line count, however, is defined by addresses $A_4$ to $A_7$ and $C_s$. Binary counter 401, at its outputs $A_4$ to $A_7$, counts 16 lines (0 to 15) and counter 402 outputs $C_s$ as the next (fifth) binary digit to afford a total line count of 32 (0 to 31). The next count resulting from INCRLA (effecting a 100000 count) results in the output (on line 402a) which sets the flip-flop of NOR gates 405 and 406 to reset the line count to line 01.

Although 32 lines are thus provided, more lines of memory, of course, could be implemented. The $C_s$ output is treated separately since it serves to select between two banks of memories — and thus is optional, as a function of the memories employed (to be discussed in FIGS. 4A and 4B). The line select ROM 214 of FIG. 2A will be recalled to produce a "2nd 16" output. That output is encoded by inverter 401a in FIG. 3A to produce the $A_8$ output. This output provides for a 32 digit line (instead of 16 — not to be confused with the "open field" operation affording two additional fields per line) by calling up an additional 16 digit positions into the memory cycle for a given line, for certain pre-programmed fields (i.e., pre-programmed by ROM 214).

Thus, the binary outputs of counters 401 and 402, are the line address inputs to memory.

The BCD counters 403 and 404, however, provide 4-bit binary outputs identifying the units ($U_1$ to $U_4$) and tens ($T_2$ to $T_4$) digits of the line count, for purposes of display.

The binary counters 401 and 402 and BCD counters 403 and 404 are preset to line 01 through NAND gate 400 at the start of the transmit sequence when XMIT* falls to 0, at the end of the reset sequence when RSTEND falls to 0, or when the back shift key is held down for longer than 819.2 m sec. causing the BSHFTDLY line to fall to 0. The counters are also reset when the maximum line count is reached, through the flip-flop formed by NAND gates 405 and 406 and inverter 405a. The counters are incremented by each INCRLA pulse in a direction determined by BSHFT. Following reset by the flip-flop, the next INCRLA applied to the counters to resume their count also resets the flip-flop.

A "zero" count of counters 401 and 402 is detected by elements 407, 408 and 408a to produce BSHFT INHIBIT which prevents additional BSHFT pulses from occurring from the output of NOR gate 130 (FIG. 1B), to prevent rolling backward past line zero.

Figure 3B:
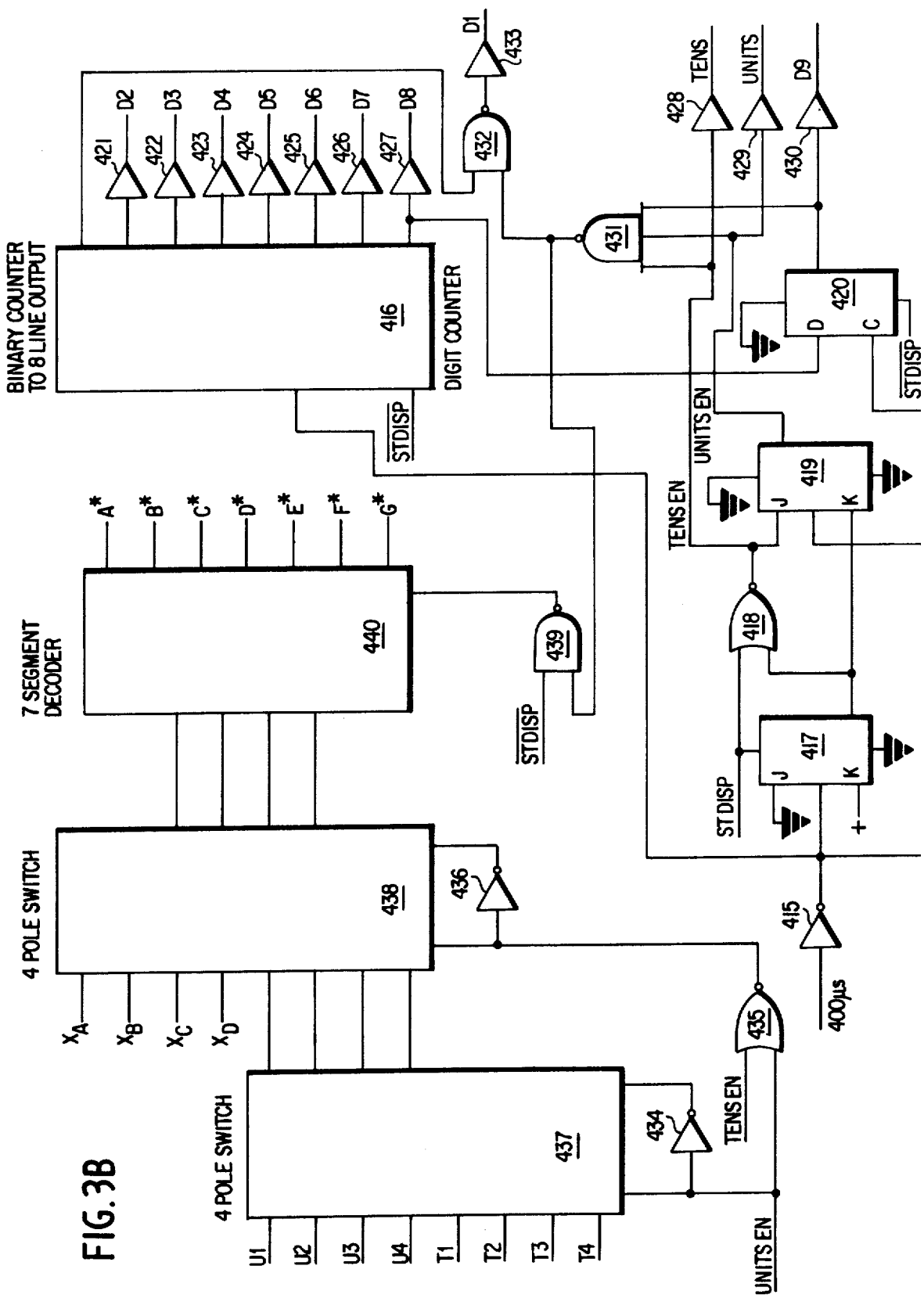

The display circuitry is shown in FIG. 3B. Each time ST DISP falls to zero, digit counter 416 counts the 400μsec. pulses from inverter 415 and activates the output lines D1 through D8 in sequence. Following generation of D8, the next 400μsec. pulse from inverter 415 sets flip-flop 420 to the D8 value (logic 1) to generate D9, and D8 terminates. The next 400μsec. pulse then clocks flip-flop 420 to set to zero and D9 terminates. Thus, each time ST DISP goes to 0, nine successive output pulses D1 to D9 are produced at the 400μsec. clocking rate. These outputs are applied to corresponding ones of nine LED data displays to activate each display in synchronism with addressing of the nine (maximum) digit positions of a field currently addressed in memory.

Flip-flops 417 and 419, and NOR 418, control the timed energization of the line number display positions. Prior to ST DISP, flip-flop 419 is set by a 400μsec. clock pulse, producing a 0 output. At the start of the display, ST DISP rises to one and sets flip-flop 417, producing a 0 at the output of NOR gate 418. The output of flip-flop 419 remains 0 since both inputs are 0. Because of the propagation delays in the circuitry, signal transitions occur slightly after the transitions for the 400μsec. pulse train. Thus, when ST DISP falls to 0, both inputs to NOR gate 418 are 0 and a TENSEN signal is produced,. Since ST DISP is no longer 1, the next 0 to 1 transition on the output of inverter 425 clocks a 1 to the output of flip-flop 417. This causes the output of NOR gate 418 to fall to 0, thereby terminating the TENSEN signal. However, while the TENSEN signal is still present at the input to flip-flop 419, a 0 to 1 transition at the output of inverter 415 occurs thereby clocking a 1 to the outut of flip-flop 419 and producing the UNITSEN signal shortly thereafter. The next 0 to 1 transition at the output of inverter 415 clocks the 1 at the output of flip-flop 417 to the output of flip-flop 419, thereby terminating the UNITSEN signal. Thus, it can be seen that after ST DISP and at the conclusion of each display period, a TENSEN pulse and a UNITSEN pulse are produced in sequence to illuminate the tens and units indicators of the line number display, as shown in FIG. 3C.

The display illustratively comprises, for each digit position, a seven segment font of individually energizable light emitting diodes (LED's). Accordingly, a 7 segment decoder 440 outputs on 7 lines A* to G* suitable energizing signals for the corresponding segments. These outputs are applied in common to each display position, as denoted by the (*) and the appropriate display position is enabled in timed sequence with the application to decoder 440 of the corresponding digit display information as to line number and data.

Thus, as seen in FIG. 3B, 4-pole switch 438 normally supplies the digit data from memory on inputs $X_A$ to $X_D$ to decoder 440. Under control of each TENSEN and UNITSEN through NOR 435, switch 438 supplies the outputs of switch 437 to decoder 440 — the switch 437 in turn normally supplies the tens digit bits ($T_1$ to $T_4$) to switch 438 but, in response to UNITSEN instead supplies the units digit bits ($U_1$ to $U_4$) to switch 438, each for application to decoder 440.

Elements 409 through 412 (FIG. 3A) comprise the power control circuitry. To conserve power, mercury tilt switch 411 opens to turn off the display panel when the unit is disposed downwardly — a nrmal position when not in use. When the unit is tippd up, as one would hold the device when entering data, the display is energized. A replaceable, preferably rechargeable, external battery 409 serves to power the display, to trickle charge the internal battery, and, when connected, to power the logic. When the external battery 409 is disconnected for replacement, the smaller internal battery 410 powers the logic. The small internal battery 410 can supply the logic for several hours to allow for charging or recharging the external battery, thus making the memory essentially immune to battery discharge problems.

A battery low voltage detector 412 produces a pulsating BATTLO signal whenever the battery voltage falls below a predetermined value. NAND 414 detects BATTLO and the output of NAND 413, when the recirculation address is equal to the digit address (RA = DA) and STDISP is 1 (the digit address is greater than the start address but below the end address) to produce $dp^*$. $dp^*$ thus is steady. The output of NAND gate 414 will also be 1 whenever $\overline{BATTLO}$ is 0 indicating that the battery voltage has fallen below a predetermined value. Since the digit address is a steady state value and the recirculate address is rapidly changing, the decimal point for that digit will be turned on only for the display digit in which data is about to be entered. However, when the battery low signal is produced, all of the decimal points in the display will be illuminated by the pulsating $\overline{BATTLO}$ signal to produce a blinking effect.

Figure 4B:
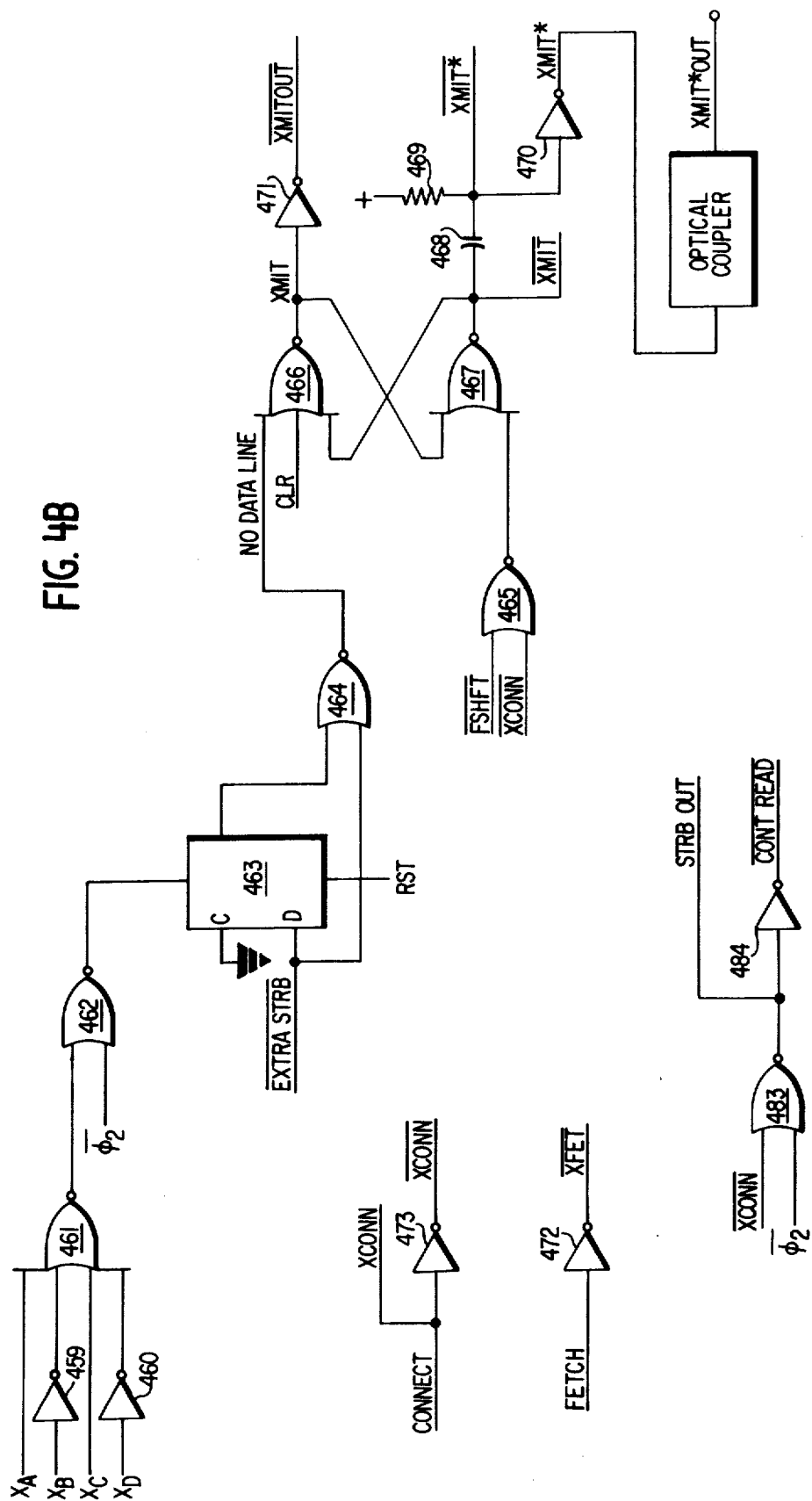

The memory and output circuits are contained in FIGS. 4A and 4B. The memory for the A bit comprises registers 451 and 452, for the B bit, registers 453 and 454, for the C bit, registers 455 and 456, and for the D bit, registers 457 and 458. The memories are addressed in common by $A_0$ to $A_8$. In addition, $C_S$, the highest order bit of the line address, selects between memories 451, 453, 455 and 457 ($C_S$) and memories 452, 454, 456 and 458 ($C_S$). During data entry, the dataholder is not connected to the formatter and thus $\overline{XCONN}$ is 1. NAND gate 450 thus is enabled by each 7μsec. MSTRB pulse to gate a 4-bit word (A to D) into the commonly addressed memory locations (line and digit position) of the corresponding memories A to D (in the set selected by $C_S$).

The data in memory, as addressed, is always available for read-out at $X_A$ to $X_D$, and thus for simultaneous display during write-in (MSTRB = 1) or merely for display of stored data (MSTRB = 0) as well as for transmission, or read-out.

Figure 6B:
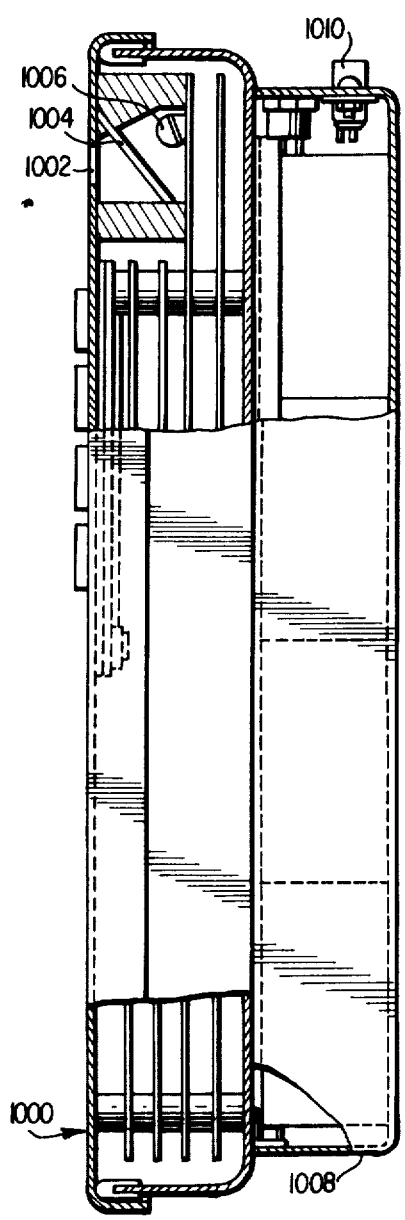

As previously noted, for transmission of the data from memory in the dataholder at the remote terminal, the dataholder is electrically connected to a corresponding connector of the interface-formatter. Preferably, this is accomplished simply by sliding the formatter into position to complete the electrical connection as shown further in FIGS. 6A and 6B. As illustrated, this automatically produces a CONNECT signal, although a separate switch could, of course, be provided. Data transmission then is initiated by depressing the forward shift key. The transmission automatically terminates when a clear code for an entire line of data is detected, or by activating the clear key.

In FIG. 4B, the CONNECT signal produces XCONN and, through inverter 473, $\overline{XCONN}$. As will be described, and as mentioned earlier, the interface-formatter sends a FETCH pulse to the dataholder to request each new character, FETCH producing $\overline{XFET}$ through inverter 472. $\overline{XCONN}$ and $\phi_2$ are detected by NOR gate 483 to produce STRBOUT and, through inverter 484, $\overline{CONTREAD}$. Preferably each of the foregoing signals communicated between the dataholder and the interface-formatter as well are coupled through optical isolators (i.e., including as well $\overline{XMITOUT}$, XMIT*, etc.).

In FIG. 3D each seven segment LED digit 492a through 492k is driven in common at the anode connections by the outputs A* and G*, and $dp^*$, from seven segment decoder 440 and NAND 414. The cathode connection of each LED digit is driven respectively by transistors 491a through 491k. The transistors 491a through 491k are switched on respectively by the positive signals D1 through D9, TENS, and UNITS. Thus, each LED digit 492a through 492k is enabled in timed sequence with the outputs of seven segment decoder 440 and NAND 414 to display the corresponding digit information as to line number, data, and cursor position.

When the dataholder is so connected and the forward shift key is depressed, $\overline{XCONN}$ and FSHFT are both false, enabling NOR 465 and setting the flip-flop of NOR gates 466 and 467 to the transmit mode, producing XMIT and its complement. The one to zero transition at the output of NOR gate 467 is coupled through capacitor 468 to produce $\overline{XMIT^*}$ and, through inverter, 470, its complement $\overline{XMIT^*}$.

Referring to FIG. 4C, the memory outputs $X_A$ through $X_D$ are supplied to corresponding gating circuits which, if enabled, produce the output bits $A_{OUT}$ to $D_{OUT}$ for transmission to the interface-formatter. Preferably optical isolators couple the logic gate outputs to the output terminals. As shown, the CONNECT signal enables the isolators 486 to 489. Assuming that a character presently read from memory as the signals $X_A$ through $X_D$ is not the first character of a new data line, the 1st CHAR flip-flop 249 of FIG. 2B is not set and thus the 1st CHAR input to each of NOR 475 and NAND 476 is false. $\overline{XCONN}$ is false and $\bar{\phi}$ is false (from FIG. 1E) since it is assumed that the system currently is in the 30μsec. address interval of $\phi$. The enabled NOR 475 output is inverted twice through inverter 474 and NOR 475 for supply to isolator 486, for generation of $A_{OUT}$. Under the same assumptions, NAND 476 enables NAND gates 480 to 482 to pass the outputs of the corresponding NAND gates 477 to 479 which are likewise enabled by XCONN and $\phi$. In accordance with the preceding assumptions, the memory outputs $X_B$ to $X_D$, respectively, are doubly inverted and coupled to the corresponding isolators 487 to 489 to produce $B_{OUT}$ to $D_{OUT}$ respectively.

Where a character currently presented as $X_A$ to $X_D$ is the first of a new line, the 1st CHAR input is true and the logic gates are disabled. It will be recalled that under this condition, the digit address for the memory likewise is not advanced, so that the dataholder may transmit the end of line tag or code to the formatter which in turn generates the end of line sequence (CR, LF, $RO_1$ and $RO_2$).

The circuits of FIG. 4B generate the end of line tag 0111. NOR 475, in response to the true input 1st CHAR, supplies logic 0 as $A_{OUT}$; conversely, NAND 476, in response to 1st CHAR during $\phi$, outputs logic 0 to NAND 480, 481 and 482 which in turn supply logic 1 as the outputs $B_{OUT}$, $C_{OUT}$ and $D_{OUT}$.

The transmit mode is terminated, as previously noted, when the clear code is detected for an entire line of data. NOR gate 461 receives $X_A$ and $X_C$ directly and $X_B$ and $X_D$ through inverter 459 and 460. Recalling that the clear code is 0101, NOR gate 461 outputs logic 1 for each clear code detected in a digit position. NOR 462 therefore outputs 0 if for an entire line, no character other than the clear code is read from memory. This serves to maintain flip-flop 463 reset and thus outputting logic 0 to NOR 464. XTRASTRB at the set input to flip-flop 463 (produced by the 1st CHAR flip-flop 249 of FIG. 2B) becomes logic 0 when the 1st CHAR flip-flop 249 is reset thereby enabling NOR 464 to output NO DATA LINE to the flip-flop of NOR gates 466 and 467. This resets the flip-flop, ending the XMIT mode. Flip-flop 463 is reset by RST and thus normally outputs logic 1 to NOR 464.

The interface-formatter circuits are shown in FIGS. 5A through 5F.

Figure 5A:
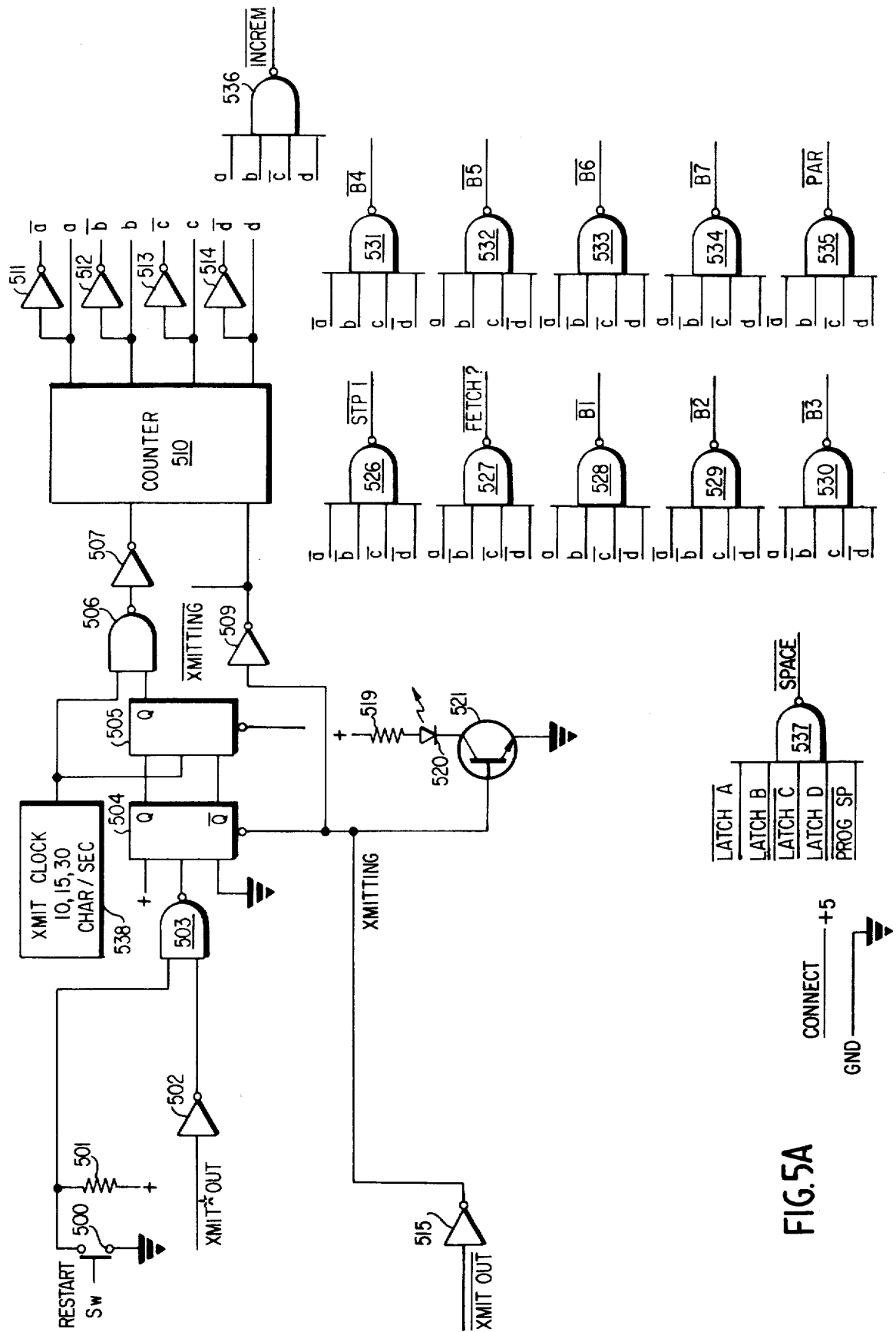
FIGS. 5A through 5F, inclusive, comprise circuit diagrams of the interface formatter.

FIG. 5A shows primarily the initiating controls and interfaces with the dataholder and a sequence generator which controls the rate of read-out of data from the dataholder and the sequence in which data bits are supplied in the output bit stream from the formatter.

As discussed in relation to FIGS. 4A–4C, when the dataholder is connected to the formatter and the forward shift button is depressed, XMIT*OUT is transmitted to the formatter and in FIG. 5A is applied through inverter 502 and effectively inverted by NAND 503 to set flip-flop 504. Flip-flops 504 and 505 were previously reset and thus flip-flop 505 presents logic 0 to NAND 506.

Transmit clock source 538 generates a selectable clocking rate of 10, 15 or 30 pulses per second to produce correspondingly a character per second transmission rate, and hence read-out rate, from the dataholder. On the transmit clock pulse next occurring after the setting of flip-flop 504, flip-flop 505 is set whereupon NAND 506 is enabled by two logic 1 inputs to supply through inverter 507 a clock pulse to counter 510. NAND gate 506 remains enabled for supply of the transmit clock pulses and counter 510 continues to count, generating a 4-bit BCD output $a$, $b$, $c$, $d$ and their complements. These 4-bit outputs are decoded by NAND gates 526 through 535 to produce in sequence $\overline{STP\ 1}$, $\overline{FETCH\ ?}$, $\overline{B1}$ through $\overline{B7}$, $\overline{PAR}$ and $\overline{INCREM}$. There is also a one shot space between $\overline{FETCH}$ and $\overline{B1}$ which is not decoded.

Counter 510 continues this cycling count through its 12 output conditions in synchronism with the transmit clock rate until conclusion of readout of the data from the dataholder. Particularly, when $\overline{XMITOUT}$ becomes true, XMITTING, through inverter 515, becomes false and resets flip-flops 504 and 505. Through inverter 509, $\overline{XMITTING}$ becomes true and counter 510 is reset.

The data stored in the data holder may be arranged in blocks of any desired number of lines, if desired, by the simple provision of skipping a line of data entry and leaving a line blank. As described elsewhere herein, when the interface-formatter receives an entire line of clear codes, it terminates sending of further requests for more data, and thus the dataholder terminates read-out of data.

This permits, for example, removal of a billing ticket, or the like, printed at the remote terminal, and insertion of a new ticket to be printed. The dataholder is essentially in a standby mode in this instance, and by depression of the forward shift button, the transmit and read-out mode is established again to read-out the next block of data.

Organization of the stored data into blocks also permits use of header information for each block (as indeed it may be provided for any stored data) in accordance with an appropriate format, as desired, for which the system is programmed, for recognition and interpretation of the header as distinguished from data.

A separate header identification code may be employed in the present system in the alternative, through the provisions taught in the copending application of Azure Ser. No. 435,540, filed Jan. 22, 1974.

Note also that while XMITTING is true, transistor 521 is rendered conductive to energize LED 520 to indicate to the operator that transmission is occurring.

Figure 5B:
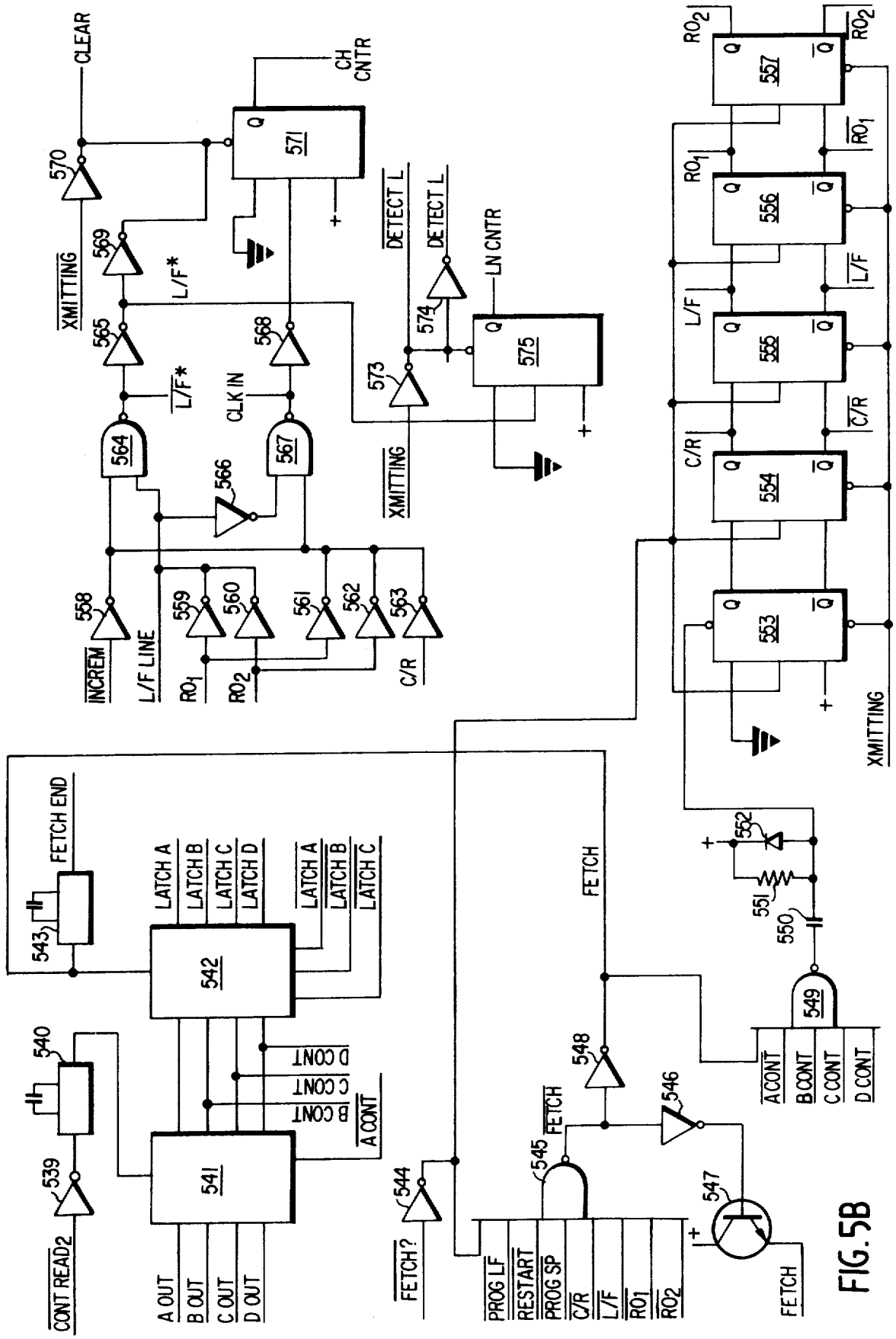

In FIG. 5B, the 4-bit parallel data lines AOUT to DOUT are connected to inputs of bistable latch 541. $\overline{CONTREAD}$ from FIG. 4B produced at $\phi_2$ during "connection" is applied through inverter 539 to one shot 540 to set the outputs of latch 541 to its inputs. The resulting outputs ACONT through DCONT are applied to the inputs of bistable latch 542, which then is set at the trailing edge of the next occurring FETCH pulse, the latter also activating one shot 543 to generate FETCHEND.

FETCH is generated by NAND 545 in response to the $\overline{FETCH?}$ decode output of counter 510 in conjunction with the negation of various logic conditions as shown, including the end of line sequence, and others. When none of these conditions exists, the $\overline{FETCH}$ output of NAND 545, through inverter 548, supplies FETCH to latch 542, thereby producing the outputs LATCH A through D and the complements of A through C, and through one shot 543, FETCHEND. $\overline{FETCH}$, through inverter 546, activates transistor 547 to produce FETCH for transmission to the dataholder to select a further character for transmission to the interface-formatter.

NAND 537 responds to $\overline{LATCH\ A}$ and $\overline{LATCH\ C}$, and LATCH B and LATCH D and also $\overline{PROGSP}$ to produce SPACE; this corresponds to decoding the clear code 0101, previously discussed, to produce a space during printout or for transmission of a space code to a remote receiver.

The end of line sequence (C/R, L/F, $RO_1$, $RO_2$) occurs during XMITTING whenever FETCH and the 1st CHAR code which follows each data line (0111) is detected by NAND gate 549. The 1 to 0 transition at the output of NAND gate 549 is differentiated by capacitor 550 and resistor 551 (with parallel protective diode 552) to produce a negative going pulse that sets flip-flop 553. Upon the next FETCH? stage the 1 at the output of flip-flop 553 will be shifted to the output of flip-flop 554, and a 0 will be clocked to the output of flip-flop 553. Thereafter, the 1 will be shifted one flip-flop upon each succeeding FETCH? stage producing in sequence C/F, L/F, $RO_1$ and $RO_2$.

Figure 5C:
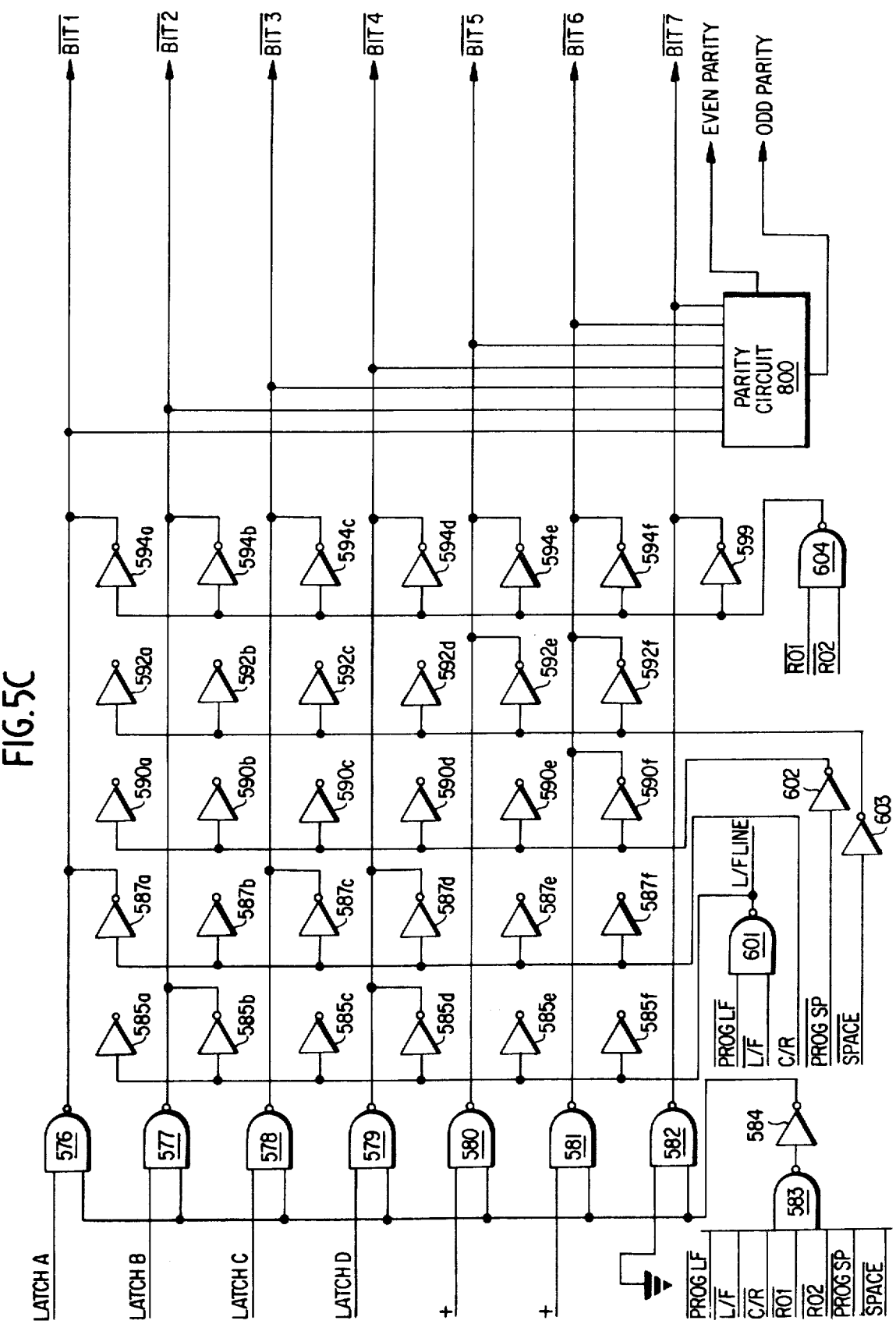

For a purpose to be described, the number of characters in each line and the number of lines are counted. Whereas the respective counters are shown in FIG. 5E, the count pulse inputs thereto are generated in FIG. 5B. Particularly, the set output from flip-flop 571, CHCNTR, is true for each character and the set output from flip-flop 575, LNCNTR, becomes true for each line.

Considering first flip-flop 571, it is reset during transmission of a character by $\overline{XMITTING}$ through inverter 570 and also when $\overline{INCREM}$ is 0 (through inverter 558 and NAND 564) and also when any of the end of line sequence conditions are true, or logic 1, i.e., L/F line, $RO_1$, $RO_2$ and C/R as applied through inverters 559–563, as indicated, to the inputs of NAND 564.

Where none of the special characters before noted is present, the normally zero output of NAND 567 switches to 1 in response to the INCREM pulse produced each time a character is transmitted in accordance with $\overline{INCREm}$ applied through inverter 559 to NAND 567. This requires that L/F line be zero thereby through inverter 566 producing a logic 1 to NAND 567, so that the logic 1 output therefrom is obtained on the trailing edge of INCREM.

In summary, one CLKIN pulse is produced for every INCREM pulse and thus each time a character is transmitted, and one $\overline{L/F^*}$ pulse is generated for each L/F line pulse and CLKIN time a line feed is transmitted. The Q output of flip-flop 571 thus is set to 1 and the one output of CHCNTR for each character thus is supplied to the character counter.

If either RO$_1$, RO$_2$ or C/R is 1, NAND gates 564 and 567 will be disabled to inhibit the production of either $\overline{L/F^*}$ or CLK IN pulses. Thus, the end of record characters are not counted by the character counter.

Just prior to transmission $\overline{XMITTING}$ is 1 which, when inverted by inverter 573, places a 0 on the set input of flip-flop 575 to make its Q output initially 1. Whenever a $\overline{L/F^*}$ signal is produced at the output of NAND gate 564 the 0 at the input to flip-flop 575 will be clocked to the Q output. Thus, the Q output of flip-flop 575 is initially set to 1 and the 1 is shifted through the line counter 700 by the L/F* pulses.

As noted, the counter 510 outputs establish the sequence and timing of the data and special character bits for transmission as a serial pulse train. In FIG. 5C, the four data bits, LATCH A to D, from latch 542 (FIG. 5B) are presented to normally enabled NAND gates 576 to 579 to produce $\overline{BIT\ 1}$ to $\overline{BIT\ 4}$, respectively. NAND gates 580 and 581 are tied to 1 inputs (+) and produce 0 outputs for $\overline{BIT\ 6}$ and $\overline{BIT\ 7}$ and NAND 582, tied to 0 (ground) produces a 1 as $\overline{BIT\ 7}$, corresponding to the numeric portion of the ASCII code.

If any special character is present at the input to NAND gate 583, the resulting 1 output through inverter 584 becomes 0 and disables NAND gates 576 through 582, tending to bias all output lines to 1, i.e., for $\overline{BIT\ 1}$ to $\overline{BIT\ 7}$. However, the presence of one or more special characters, through selected matrix interconnections of inverters 585a through 594g and the output bit lines serves to clamp certain of the output lines to 0. The particular code for a given special character may be selected by simply wire wrapping the signal line for that character to the proper output line or lines. Thus, the interface-formatter can be made compatible with any of the standard teletype or computer formats such as ASCII or EBDIC. Using the configuration shown, for example, if L/F is present, $\overline{L/F}$ is 0 which, through NAND 583 and inverter 584, sets the outputs of NAND's 576 to 582 to 1. $\overline{L/F}$ at NAND 601 supplies 1 to inverters 585a to f, setting the outputs of inverters 587a through 587f to 0. Only inverters 585c and 585d are tied to their corresponding lines, i.e., $\overline{BIT\ 2}$ and $\overline{BIT\ 4}$. Thus, the parallel ASCII code for L/F is 1010111.

Parity circuit 600 receives $\overline{BIT\ 1}$ to $\overline{BIT\ 7}$ and produces in response thereto an error or an odd parity output.

Figure 5D:
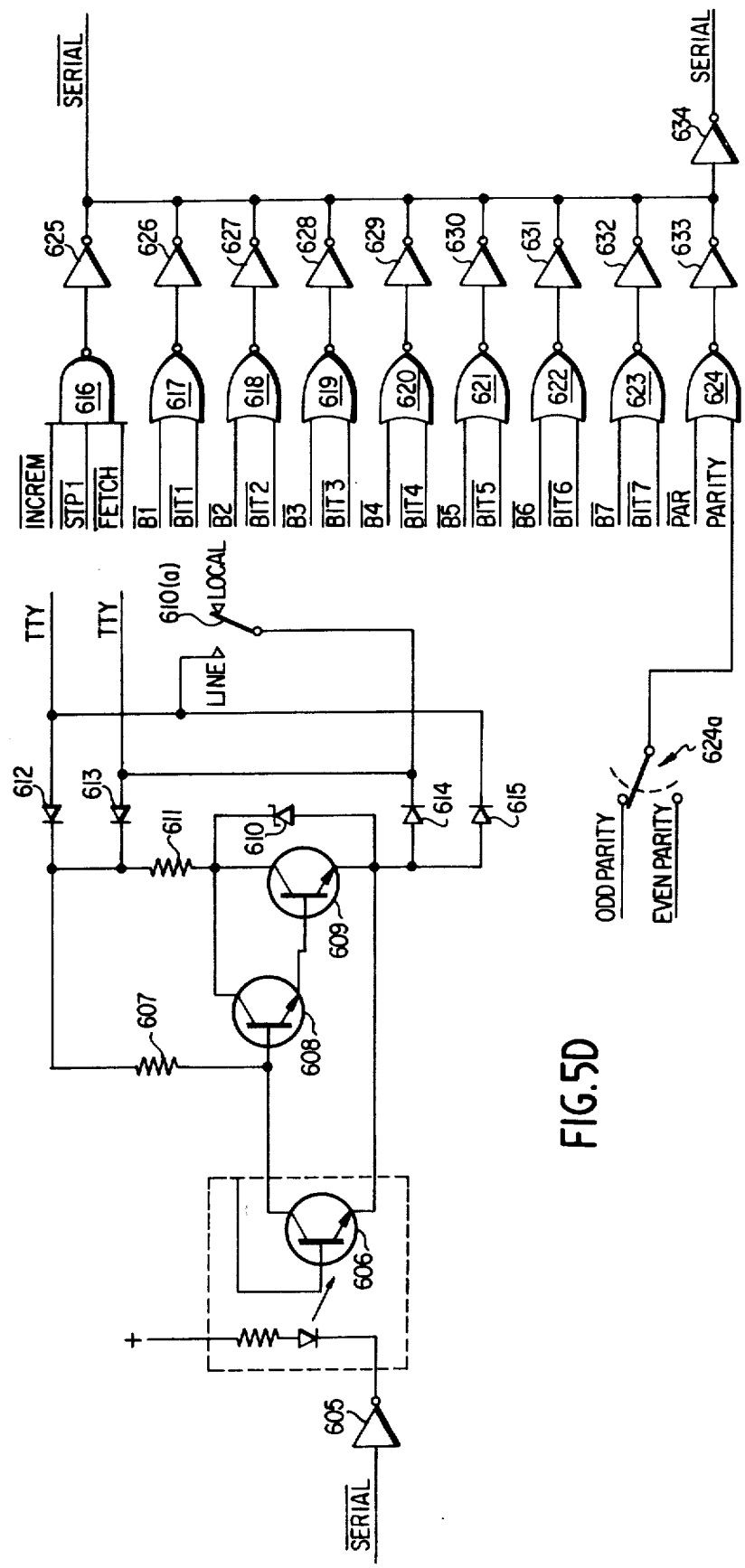
Figure 5E:
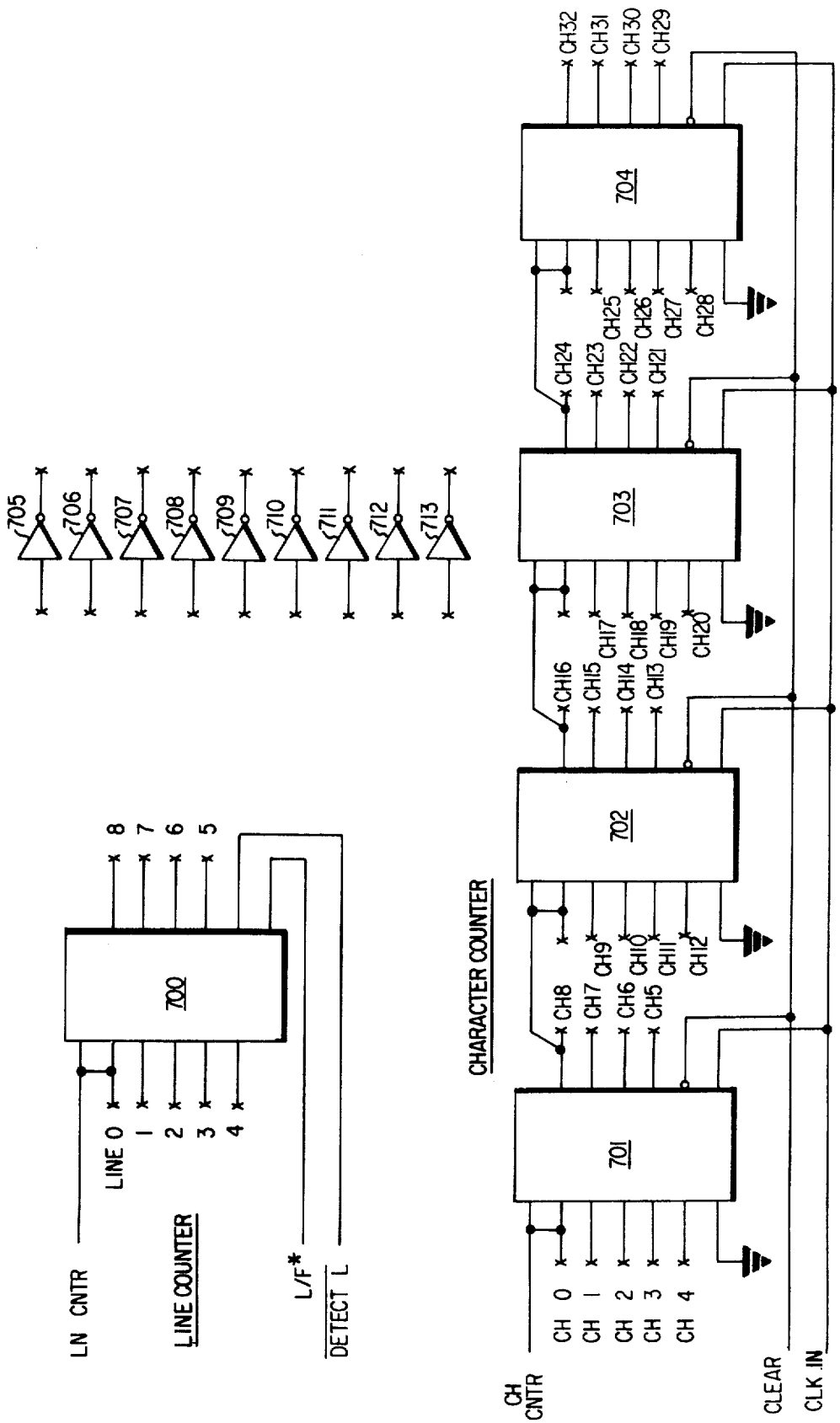

Referring to FIG. 5D, the parallel ASCII output is converted to a 12 bit serial word. The serial bit time sequencing is afforded by the sequential, decoded outputs of counter 510 (FIG. 5A): $\overline{STP1}$, $\overline{FETCH?}$, $\overline{B1}$, $\overline{B2}$, $\overline{B3}$, $\overline{B4}$, $\overline{B5}$, $\overline{B6}$, $\overline{B7}$, $\overline{PAR}$ and $\overline{INCREM}$ applied to NAND gates 616 to 624. Thus, for example, the output of NAND gate 616 is 1 for the first, second and twelfth bit times and otherwise 0. The outputs of NOR gates 617 through 623 at the fourth through tenth bit times (recall a space exists at time "three") corresponds to bits 1 through 7, respectively. Odd or even parity is selected by switch 624a, and supplied as its inverse through NAND 624 enabled by $\overline{PAR}$. The NOR gate 616 to 624 outputs, through inverters 625 to 633, are joined at a common output line to produce $\overline{SERIAL}$, and through inverter 634, SERIAL. The SERIAL output is 1, 1, 0 (Space), BIT 1, BIT 2, BIT 3, BIT 4, BIT 5, BIT 6, BIT 7, (even or odd) PARITY, and 1.

$\overline{SERIAL}$ may drive a teletype drive circuit, through inverter 605 and coupler 606. Darlington configured transistors 608 and 609 conduct for $\overline{SERIAL}$ at 0 and are off (or in low condition) for $\overline{SERIAL}$ at 1. Diodes 612, 613, 614 and 615 are provided to allow either TTY terminals to be biased with a positive voltage. Zener diode 610 is provided to clip the output voltage at a safe value when transistors 608 and 609 are in their off condition.

Figure 5F:
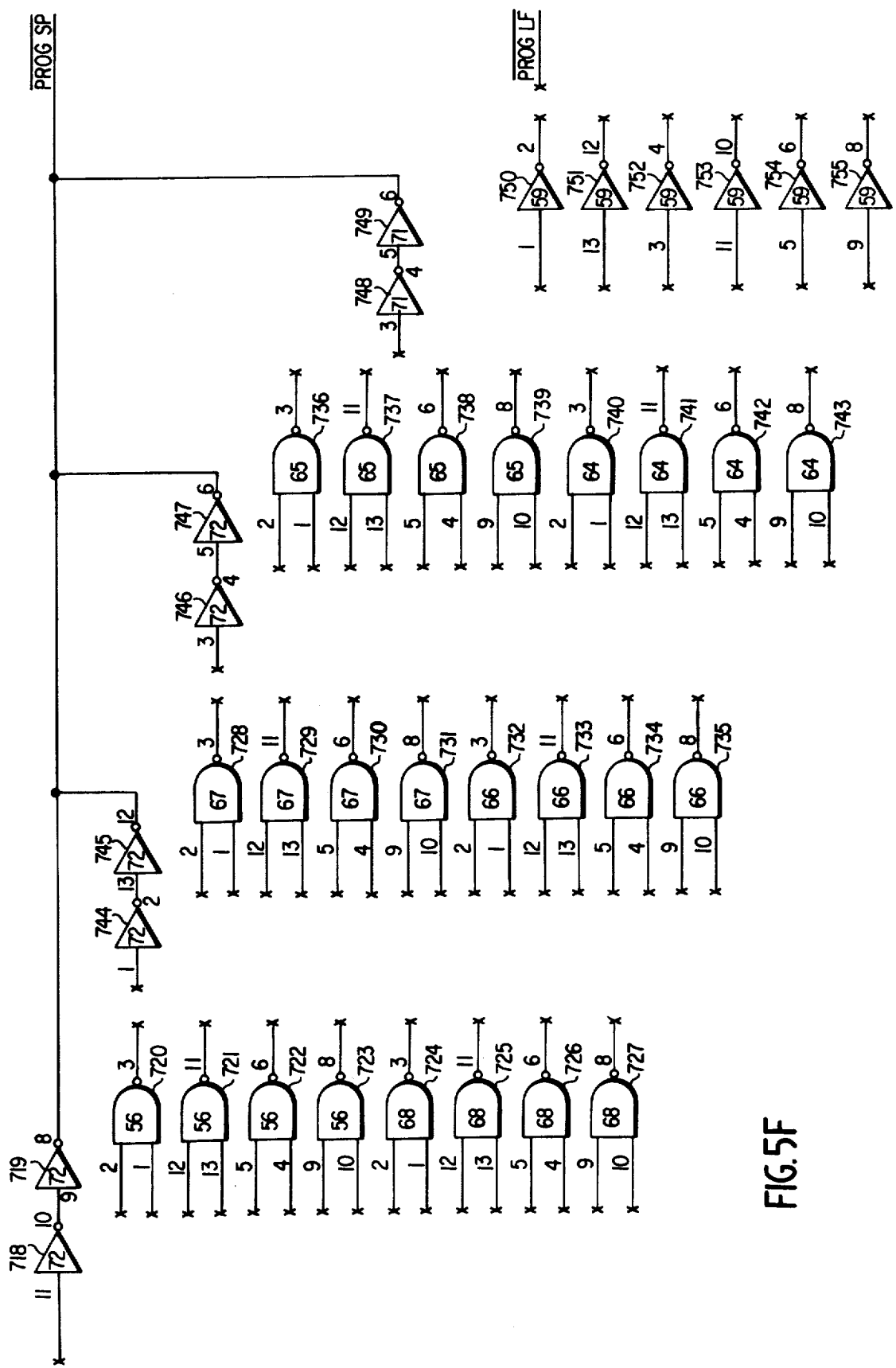

The circuits used for programming line feeds and spaces within the data stream as well as for generating a > LINE singal when a predetermined number of lines have been counted are found in FIGS. 5E and 5F.

A header may be and typically is provided for each block of data, and the dataholder can be programmed to accommodate any desired number of header lines, up to a maximum of nine, and each may be different in format. (The number 9 is simply a design choice, and additional hardware could be provided to accommodate a greater number, if required). In FIG. 5E, the line counter 700 counts the number of lines in each header. A 1 is placed at the LINE 0 input to shift register 700 at the start of transmission and at the beginning of each header. However, LNCNTR returns to 0 at the start of the first L/F* pulse. Thereafter, the 1 is shifted one stage for each L/F* pulse, and thus for each line feed, indicating the number of lines in a given header. At the start of each header, $\overline{DETECT\ L}$ is 0 and resets the line counter to zero.

The character counter 701 to 704 counts the number of characters in a given line. A 1 is placed on the CH0 input of shift register 701 at the start of each transmission and upon the occurrence of each L/F LINE pulse. However, CH CNTR returns to 0 at the start of the first CLK IN pulse. Thereafter, the 1 placed in the first stage of shift register 701 is shifted one stage for each CLK IN pulse. Since one CLK IN pulse occurs for each character transmitted, the position of the 1 is an indication of the number of characters that have been transmitted. The character counters 701 through 704 are reset to zero by CLEAR, which is 0 at the end of a transmission or whenever a line feed is transmitted.

The line counter 700 and character counter 701 through 704 (FIG. 5E) also are operative to interject spaces and line feeds in predetermined locations in the serial output. Appropriate character counter and line counter outputs are connected by wire wrap to the inputs of NAND gates 720 through 743 (FIG. 5F). The outputs of these NAND gates are connected by wire wrap to either the $\overline{PROG\ SP}$ terminals (the input of inverters 744, 746 and 748) or the $\overline{PROG\ LF}$ terminal. For example, to insert a space at line 2, character 10 of NAND gate 720 is connected at its inputs to the LINE 2 output of line counter 700 and to the CH 10 output of character counter 702. The output of NAND gate 720 is connected by wire wrap to the input of inverter 744. Thus, when line 2 character 10 is reached, the output of NAND gate 720 will fall to 0 and, after passing through inverters 744 and 745, will appear as a 0 on the $\overline{PROG\ SP}$ signal line.

Inverters 750 through 755 provide the capability of programming a wide variety of logic functions.

The portable dataholder device, or electronic notebook, is intended for hand-held operation and thus must be lightweight and portable, and operable under extreme environmental conditions. The arrangement of the keyboard and display on the upper surface of the device as shown in FIG. 6A has been discussed previously. With joint reference to FIG. 6B, the display area 1002 includes a recessed display screen 1004 for viewing the characters formed by the light emitting diodes 1006. Any of numerous types of electro-optical display elements may be employed, the elements 1006 being merely illustrative. Recall that a mercury switch energizes the display when the device is inclined toward a horizontal position, the recessed screen 1004 facilitating viewing even in bright daylight.

The data and control pushbuttons are flush with the upper surface of the housing 1000 to avoid inadvertent actuation. The necessary electronics are mounted on suitable circuit boards or other circuits, as suggested in FIG. 6B. A removable battery pack 1008 is carried on the back surface of the portable dataholder. A multiple contact connector 1010 carrying numerous electrical connections to the memory and control circuits of the dataholder is mounted for convenience on the rear of the housing. A protective cap on the connector may be provided or other precautions taken to insure hermetic sealing of the dataholder unit.

Figure 7A:
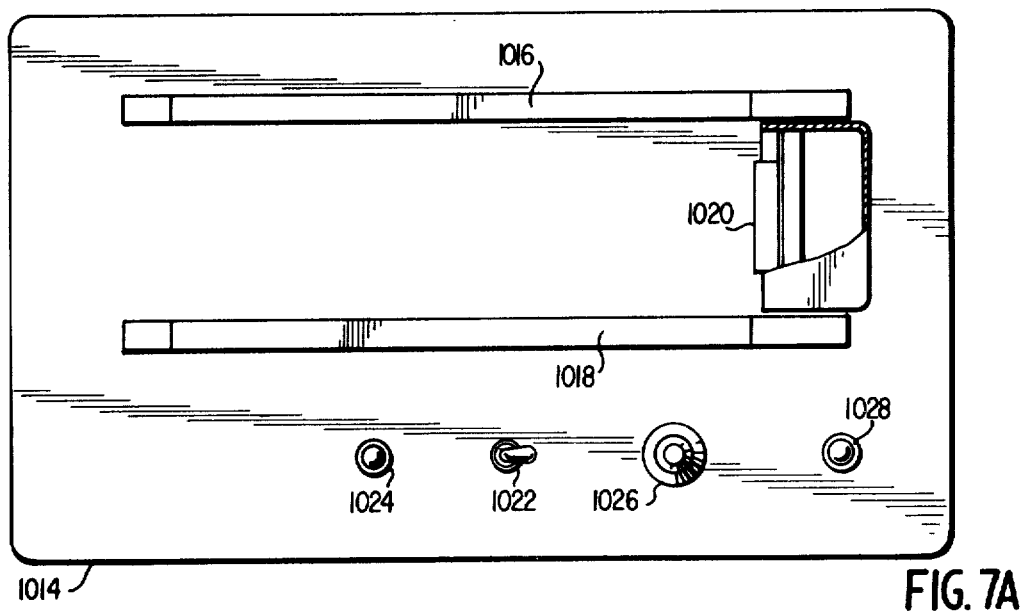
FIGS. 7A and 7B comprise top and side views of the structure of the interface formatter, and FIG. 7C comprises an end view, partially in cross section, as to the interface formatter of the dataholder as physically received on the interface formatter for interconnection of the dataholder and the interface formatter.
Figure 7B:
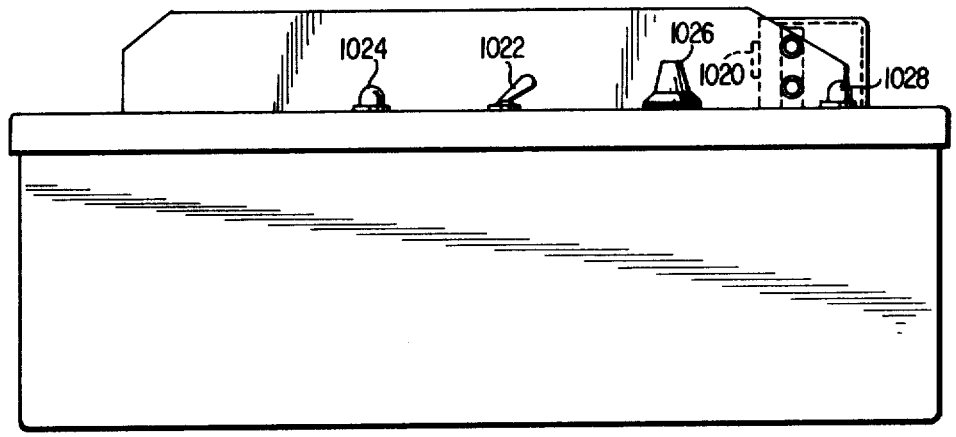
Figure 7C:
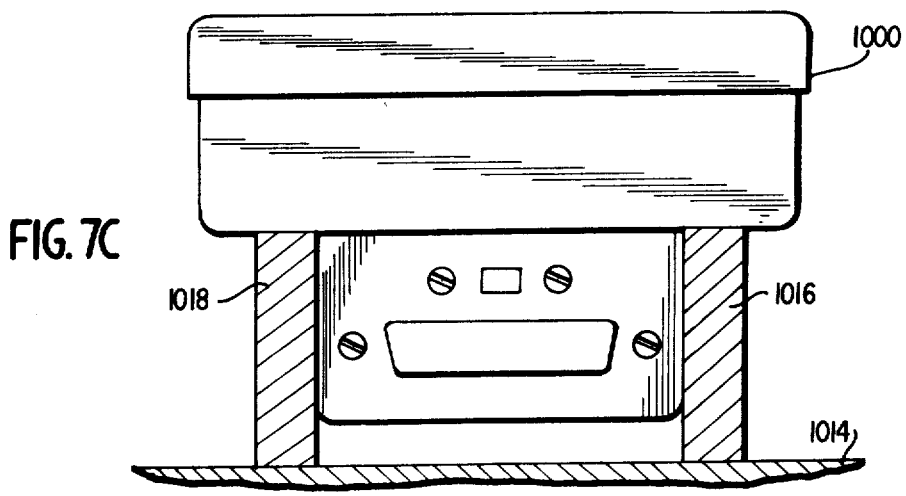

In the planar and side views of FIGS. 7A and 7B, the housing 1012 for the interface and formatter circuits includes an upper planar surface 1014 carrying 2 spaced apart vertical rails 1016 and 1018 and a connector 1020. FIG. 7C shows that the connector 1020 mates with the connector plug 1010 of the dataholder when the latter is received on the side rails, thereby to provide an automatic electrical connection between the dataholder and the formatter and interface circuits.

An on/off power switch 1022 and a suitable indicator 1024 may be provided. A local/line switch at 1026 selects between local print-out or transmission. A transmitting indicator 1028 corresponds to the light emitting diode 520 of FIG. 5A, for indicating data transmission.

In summary, the system of the invention achieves the desiderata of a true electronic notebook having greatly simplified data input operations with simultaneous display for verification. Connection of the dataholder to the interface/formatter circuit which may be at a remote station for communication to a central is of the utmost simplicity and the operation for reading out of the stored data requires actuation of essentially only a single switch, the data being read out in a format which is both computer-compatible and suitable for transmission, totally avoiding the need for keypunch or other intervening operations. A significant feature is that the system performs formatting independently of the dataholder device per se, simplifying its construction while maximizing the data packing density. The "wire-wrap"-programming of the formatter may be afforded in the alternative by a programmed diode matrix. Plural, differently programmed such matrices may be provided in a given formatter/interface unit, to be selected in accordance with the intended formatting of the information items collected in any of various different dataholders. Greater versatility of a given formatter thus is provided.

Whereas the stored data is not formatted per se, the diode matrix ROM (214) provides both for entry and display of data in accordance with the desired format. The ROM may be changed in the field for a different format.

The disclosed format includes two standard fields per line, with any desired number (up to 9) of characters per field (up to a maximum of 16 per line) and the availability of two additional such fields per line. Moreover, the ROM permits programming a second 16 characters per line. The maximum limits are arbitrary, of course, and may be altered as desired.

The operator may call up any field in any line, may tab a character entry position for each line, may enter or erase (clear) and re-enter a character at any desired position at random, and may scan the storage in a number of modes — e.g., line by line for a given field (similar to scanning a column of figures on a page), in forward or backward directions, or field by field in succession for all lines in succession.

A significant feature is the ability to enter fixed data into selected locations from an external source through the input/output connector, in relation to which fixed data variable (source) data thereafter is entered.

The automatic formatting during read-out either for local hard copy printout and/or for transmission is, of course, highly significant, eliminating human errors while greatly increasing speed of data collection and transmission. Moreover, data storage is retained for verification prior to, during and after read-out. The dataholder thus is a true electronic notebook.

Numerous modifications, adaptations and applications of the system of the invention will be apparent to those skilled in the art, and thus it is intended by the appended claims to cover all such modifications, adaptations and applications which fall within the true spirit and scope of the invention.

What is claimed is:

1. A self-contained, hand-held portable data collection device for receiving and storing character data for subsequent read-out and transmission of the character data in a desired format to a utilization means, comprising:

entry means for supplying coded signal representations of character data and controls, the character data coded signals to be stored in said device at addresses determined in accordance with control coded signals associated with the character data coded signals, A random access memory having plural character data storage positions arranged in plural lines, each line including plural said storage positions, means for addressing the memory in accordance with the control coded signals for entry and storage of the character data coded signals in an addressed position, display means for visually displaying characters represented by character data coded signals, output connection means, said addressing means including means for selectively addressing said memory for reading out character data coded signals stored in positions of said memory and for selectively supplying said signals read out from said memory to said display means for display thereof, and to said output connection means to be available for transmission thereof to a utilization means, and electrical energy storing means integral with said self-contained hand-held portable data collection device for supplying electrical energy to the aforesaid means for operation of the said device, said electrical energy storing means comprising:

first and second energy storing cells, and means connecting said first and second energy storing cells normally to enable said first cell to supply electrical energy as aforesaid and to permit depletion of substantially all electrical energy stored in said first cell prior to depletion of the electrical energy stored in said second cell, said connecting means being responsive to depletion of the electrical energy stored in said first cell below a predetermined level, automatically to enable said second cell to supply energy to at least said memory means for maintaining storage of said coded signals theretofore entered and stored therein.

2. A device as recited in claim 1 wherein said entry means comprises a keyboard having plural character select keys and plural control select keys, said character select keys being individually and selectively actuable for producing respectively corresponding character data coded signals and said control select keys including keys individually and selectively actuable for producing respectively corresponding control coded signals for selectively addressing said memory.

3. A data collection device as recited in claim 1 wherein said entry means comprises means for receiving externally supplied data and associated control coded signals, and said addressing means is responsive to the externally supplied control coded signals and said externally supplied data coded signals for addressing said random access memory in accordance with said external, coded control signals and for entering and storing said externally supplied data coded signals in corresponding positions of said memory in accordance with said addressing thereof.

4. A device as recited in claim 1 wherein:

said memory includes means for continuously recirculating the contents of the storage positions of each line thereof, and said selective supplying means supplies the character coded signals from at least selected ones of the storage positions of the line of said memory addressed by said selective addressing means, during said recirculation thereof, for display by said display means.

5. A device as recited in claim 4 wherein said addressing means includes means for accumulating a count corresponding to the line of a currently addressed position of the memory.

6. A device as recited in claim 5 wherein said display is responsive to the count of said accumulating means for displaying the number of the line currently addressed in accordance with that accumulated count.

7. A device as recited in claim 1 wherein there is further provided:

means defining a desired number of fields in each said line, each field comprising a pre-selected number of storage positions defined in accordance with predetermined start and end addresses out of the plurality of addressable storage positions of a line, said entry means includes means for supplying line shift control signals to effect, selectively, forward and backward shifting through successive lines of the memory and field shift control signals for shifting to successive fields of a given line of the memory, thereby to select a line and field of the memory for data entry and read-out, said addressing means being responsive to said line and field shift signals for correspondingly advancing to and addressing the selected line and field of the memory, and said display means includes individual display elements corresponding to the storage positions of a field for displaying characters in accordance with the coded character signals stored in the positions of a selected, addressed field and line of said memory.

8. A device as recited in claim 7 wherein said addressing means further includes means for maintaining an indentification of a selected field, and said addressing means is responsive to each successive line shift control signal to advance to the corresponding field as identified by said field identification maintaining means in each such successive line.

9. A device as recited in claim 8 wherein said addressing means further includes means for producing and storing a cursor identifying a currently addressed position of a given line, and is responsive to each successive line shift control signal to advance to a successive line and address the corresponding position thereof as identified by the stored cursor of said cursor storing means.

10. A device as recited in claim 9 wherein said display means further includes means associated with each character display position to provide a visual cursor indication and means for selectively energizing said cursor indication means in accordance with the position of said stored cursor to identify the currently addressed position in memory.

11. A device as recited in claim 9 wherein said addressing means includes means responsive to each field shift control signal to select the start position for that field as the initial addressed position for the field, said storing means storing the cursor to identify the said initial address position as the currently addressed position.

12. A device as recited in claim 11 wherein said cursor producing means is responsive to each successively entered character data signal to advance the cursor to the next successive position of the selected field.

13. A device as recited in claim 9 wherein said entry means includes means for supplying cursor forward and backward shift control signals, and said cursor producing means is responsive to said cursor shift control signals to shift the stored cursor position selectively forward and backward, respectively, through the data positions of a selected field.

14. A device as recited in claim 13 wherein said cursor producing means is responsive to the predetermined start and end addresses of a selected field to inhibit shifting of the cursor position beyond the said start and end addresses for a given field.

15. A device as recited in claim 7 wherein said entry means includes means for selectively supplying forward and backward line shift control signals for shifting through successive lines of said memory, and said addressing means responds to said line shift control signals correspondingly to address the thus identified line of memory and a field preselected therein.

16. A device as recited in claim 15 wherein means for supplying line shift control signals comprises a manually actuable control key and means responsive to actuation thereof for less than a predetermined time, to produce a single line shift control signal, said addressing means responding thereto to shift to and address a corresponding, successive line of memory, said actuation responsive means further being operable upon actuation of said control key in excess of said predetermined period of time to produce a continuing succession of line shift control signals, and said addressing means responding to each of said continuing succession of line shift control signals, correspondingly to shift to and address successive lines of said memory.

17. A device as recited in claim 7 wherein said means for supplying field shift signals includes a manually actuable control key and means responsive to actuation thereof for less than a predetermined period of time to produce a single field shift control signal, said addressing means responding thereto to address the successive field of a given line, and responsive to actuation thereof in excess of said predetermined period of time to produce a continuing succession of field shift control signals, and said addressing means responds to said continuing succession of field shift control signals correspondingly to shift to and address each field in succession for all fields of all lines in memory.

18. A device as recited in claim 17 wherein said addressing means includes means for accumulating a count corresponding to the number of successive field shift control signals and logic means responsive to successive, single such field shift control signals for advancing and recycling said count accumulating means thereby to cyclically address in succession the fields of a currently addressed line and alternately responsive to said continuing succession of field shift control signals for correspondingly advancing said count accumulating means and producing for each maximum count thereof a line shift control signal for shifting to a successive line thereby to address in succession each field of each line.

19. A device as recited in claim 17 wherein there are provided a first predetermined number of fields normally available in each line and an additional, second predetermined number of fields optionally available in each line and wherein there are further provided manually actuable means for rendering the said additional, second predetermined number of fields available during data entry operations.

20. A device as recited in claim 19 wherein, during read-out of said memory, each of said first and second predetermined number of fields is automatically rendered available in succession for successive field shift control signals during addressing of a given line of memory.

21. A device as recited in claim 7 wherein there is further provided a visual display indicator to indicate a currently selected and displayed field of the plural fields of a line.

22. A device as recited in claim 7 wherein said field defining means comprises a programmed read only memory.

23. A device as recited in claim 7 wherein said addressing means includes means for accumulating a count corresponding to successive fields shift control signals for deriving from said field defining means the start and end addresses of a currently selected field, as identified by the said count.

24. A device as recited in claim 23 wherein said count accumulating means remains at an accumulated count for successive line shift signals, thereby to continue to select the corresponding field for each of successively selected lines.

25. A device as recited in claim 23 wherein said addressing means further includes logic means responsive to a predetermined number of field shift signals to recycle said count accumulating means.

26. A device as recited in claim 1 wherein said entry means includes a keyboard having plural character data keys and plural control keys, one of said control keys comprising a clearing control key operable to enter a clear code as a character data code in an addressed position in memory.

27. A device as recited in claim 26 wherein there is further provided means responsive to initial turn-on of power to said device automatically to produce said clear code for a predetermined time interval following said power turn-on, and said addressing means is operable during said predetermined time interval following power turn-on to address each successive position of each line in succession in memory thereby to enter the clearing code in each addressable position of memory.

28. A device as recited in claim 1 for use with a read-out means to which said device is connected for reading out the data from said memory of said device for supply of the read-out data to the utilization means and wherein said device further includes:

means operable when said device is connected to said read-out means to produce a connect signal for placing said device in a read-out and data transmit mode of operation, said entry means including means for supplying a line shift control signal, and said addressing means is operable in said transmit mode of said device, in response to a line shift control signal, to address and read out each memory storage position in succession of each line, for all such lines in succession of said memory.

29. A device as recited in claim 28 wherein said addressing means further includes means for recognizing the completion of addressing of the last storage position in a given line and the advance to the first storage position of a successive line to temporarily halt the addressing of said first position of said successive line and to transmit an end of line code to said read-out means.

30. A device as recited in claim 29 wherein said read-out means, following receipt of each character data signal from said device, transmits a FETCH pulse to said device to request a further character data signal to be read out from the next successive storage position in said memory and wherein:

said addressing means responds to each such successive FETCH pulse to transmit the character data signal of the next successively addressed position in memory.

31. A device as recited in claim 30 wherein there are further provided:

means for automatically entering a clear code into each data storage position in memory prior to entry of character data, and wherein said read-out means responds to receipt of the clear code for each position of an entire line of memory thereby to terminate the transmission of further FETCH pulses to said device.

32. A device as recited in claim 30 wherein:

said entry means includes means for entering a header symbol control signal in an addressed line of memory thereby to identify successive line of character data stored in memory as a related block of data and, said read-out means responds to receipt of the header symbol as read out and transmitted thereto by said device to terminate temporarily the further transmission of FETCH pulses to said device.

33. A device as recited in claim 32, further comprising:
   means for re-initiating read-out and transmission of character data from said memory following said temporary termination, thereby to provide for read-out and transmission to, and receipt by said read-out means of the character data of each block thereof stored in said memory, in individual succession as to each of a plurality of such blocks stored in memory.

34. A device for use with read-out means as recited in claim 29 wherein said read-out means responds to each end of line code received from said device to generate an end of line sequence.

35. A device for use with read-out means as recited in claim 28 wherein said read-out means further comprises
   formatting means for responding to the character data read from each position in memory to convert the said data into a serial bit stream including coding and control bits for transmission to said further utilization means.

36. A device for use with read-out means as recited in claim 28 wherein said read-out means further includes means for receiving and transmitting to said device fixed character data and related control signals, and said addressing means of said device is responsive thereto to address the line and positions of memory in accordance with the received control signals for entry of the fixed character data into the corresponding, said addressed positions of memory.

37. A device for use with read-out means as recited in claim 28 wherein said read-out means further comprises formatting means for establishing a format of the data read from said memory of said device corresponding to the format of the data as entered into said device by said entry means thereby to control said utilization means to reproduce the transmitted character data in the format by which said character data was entered.

38. A device for use with read-out means as recited in claim 37 wherein said utilization means comprises a printer responsive to the output signals of said read-out means for printing a hard copy of the character data read out from said memory of said device in accordance with the format of that data as entered into memory.

39. A self-contained, hand-held portable data collection device for receiving and storing character data for subsequent read-out and transmission of the character data in a desired format to a utilization means, comprising:
   a keyboard having a plurality of selectively actuatable character data and control keys,
   means responsive to key actuation to produce corresponding character data and control coded signals,
   a random access memory having plural character data storage positions arranged in plural lines, each line including plural said storage positions,
   first means for storing an indication of each position of a line of memory, as addressed,
   means responsive to each character data signal produced by key actuation to advance the addressed position indication of said storing means to a successive position,
   said keyboard including selectively actuatable forward and backward line shift keys and said key actuation responsive means responding to actuation thereof to produce corresponding forward and backward line shift control signals,
   second means for storing an indication of each line address of memory, and responsive to each line shift control signal to shift, in corresponding forward and backward directions, the line address indication as stored therein to a successive line,
   addressing means responsive to the stored line and position indications of the respective storing means therefor, for addressing the thus identified position and line to render that position available for data storage,
   means for entering character data signals corresponding to an actuated key in a currently addressed position of the memory,
   display means for displaying a character corresponding to the character signals stored in at least a currently addressed memory position and
   electrical energy storing means integral with said self-contained hand-held portable data collection device for supplying electrical energy to the aforesaid means for operation of the said device, said electrical energy storing means comprising:
   first and second energy storing cells, and means connecting said first an second energy storing cells normally to enable said first cell to supply electrical energy as aforesaid and to permit depletion of substantially all electrical energy stored in said first cell prior to depletion of the electrical energy stored in said second cell, said connecting means being responsive to depletion of the electrical energy stored in said first cell below a predetermined level, automatically to enable said second cell to supply energy to at least said memory means for maintaining storage of said coded signals theretofore entered and stored therein.

40. A device as recited in claim 39 wherein there is further provided:
   means defining a desired number of fields in each said line, each field comprising a pre-selected number of storage positions defined in accordance with predetermined start and end addresses out of the plurality of addressable memory positions of a line,
   said keyboard further includes a field shift control key selectively actuable to select a next successive field,
   said means responsive to key actuation includes means to produce a field shift control signal in response to each said field shift control key actuation, and there is further provided,
   means for storing an indication of a selected field, and said means being responsive to each field shift control signal to correspondingly shift the stored indication of the selected field to a successive such field.

41. A device as recited in claim 40 wherein there is further provided:
   means for successively accessing all positions of a selected line of memory in a continuously recirculating cycle,
   said display means includes individual display positions corresponding to the maximum number of storage positions of a field, each display position displaying a character in accordance with the coded character signals stored in a position of the memory, and means responsive to the start and end addresses of a selected field as established by said defining means for supplying the coded character signals from the storage positions of the memory for a selected line and field, as accessed by said accessing means, to said display means for display at corresponding display positions.

42. A device as recited in claim 41 wherein said accessing means and said coded character signal supplying means operate in synchronism.

43. A device as recited in claim 41 wherein the indication of an addressed line stored by said storing means comprises a numerical designation of that line relative to the total lines of memory and wherein:
said display further includes character display positions for displaying a line count equal to the maximum number of lines of said memory, and
said means for supplying coded character signals from the storage positions of a selected line and field, as accessed by said accessing means, further is responsive to, and supplies, the stored numeric indication of a selected line to the line count display positions of said display.

44. A device as recited in claim 40 wherein said means for storing an indication of a stored position address maintains the said stored position address for successive line shift control signals and thus for successively addressed lines, said addressing means thereby addressing and rendering available the corresponding position in each such successive line.

45. A device as recited in claim 40 wherein said display means further includes means associated with each character display position to provide a visual display indicating th stored position address thereby to identify the currently addressed position in memory.

46. A device as recited in claim 40 wherein said addressed position storing means is responsive to each field shift control signal to store the start position for that field, from said defining means, as the currently addressed position.

47. A device as recited in claim 46 wherein said addressed position storing means is responsive to each successively entered character data signal to advance the stored position address the next successive position of the selected field.

48. A device as recited in claim 40 wherein said keyboard includes a selectively actuable key and corresponding responsive means for producing forward and backward addressed position shift control signals, and said addressed position storing means is responsive to said addressed position shift control signals to shift the stored addressed position indication selectively forward and backward, respectively, through the data positions of a selected field.

49. A device as recited in claim 48 wherein said responsive means is controlled by the predetermined start and end addresses of selected field to inhibit shifting of the stored position beyond the said start and end addresses for a given field.

50. A device as recited in claim 39 wherein said line shift key actuation responsive means is responsive to said key actuation for less than a predetermined time, to produce a single line shift control signal, and to said key actuation in excess of said predetermined period of time to produce a continuing succession of line shift control signals.

51. A device as recited in claim 40 wherein said shift key actuation responsive means is responsive to said key actuation for less than a predetermined period of time to produce a single field shift control signal, and is responsive to said key actuation in excess of said predetermined period of time to produce a continuing succession of field shift control signals.

52. A device as recited in claim 51 wherein there is further provided means for accumulating a count corresponding to the number of successive field shift control signals and logic means responsive to successive such field shift control signals for advancing said count accumulating means and for recycling said count accumulating means at the maxmum field number, thereby to address cyclically and in succession the fields of a currently addressed line, and alternately responsive to said continuing succession of field shift control signals for correspondingly advancing said count accumulating means and producing for each maximum field number count thereof a line shift control signal for shifting to a successive line, thereby to address in succession each field of each line.

53. A device as recited in claim 40 wherein there are provided a first predetermined number of fields normally available in each line and an additional, second predetermined number of fields optionally available in each line and wherein there are further provided manually actuable means for rendering the said additional, second predetermined number of fields available during data entry operations.

54. A device as recited in claim 53 wherein, during read-out of said memory, each of said first and second predetermined number of fields is automatically rendered available in succession for successive field shift control signals during addressing of a given line of memory.

55. A device as recited in claim 39 wherein said keyboard includes a clearing control key and means operable in response to actuation thereof to enter a clear code as the character data code in an addressed position in memory.

56. A device as recited in claim 55 wherein there is further provided means responsive to initial turn-on of power of said device automatically to produce said clear code for a predetermined time interval following said power turn-on, and
said addressing means is operable during said predetermined time interval following power turn-on to address each successive position of each line in succession in memory, thereby to enter the clearing code in each addressable position of memory.

57. A device as recited in claim 39 for use with a read-out means to which said device is connected for reading out the data from said memory of said device for supply of the read-out data to the utilization means, and wherein said device further includes:
means operable when said device is connected to said read-out means to produce a connect signal for placing said device in a read-out and data transmit mode of operation, and
said addressing means is operable in said transmit mode of said device, in response to a line shift control signal, to address and read out each memory storage position in succession of each line, for all such lines in succession, of said memory.

58. A device as recited in claim 57 wherein said addressing means further includes means for recognizing the completion of addressing of the last storage position in a given line and the advance to the first storage position of a successive line to temporarily halt the addressing of said first position of said successive line and to transmit an end of line code to said read-out means.

59. A device as recited in claim 58 wherein:

said read-out means, following receipt of each character data signal from said device, transmits a FETCH pulse to said device to request a further character data signal to be read out from the next successive storage position in said memory, and said addressing means responds to each such successive FETCH pulse to transmit the character data signal of the next successively addressed position in memory.

60. A device as recited in claim 59 wherein there are further provided:

means for automatically entering a clear code into each data storage position in memory prior to entry of character data, and wherein said read-out means responds to receipt of the clear code for each position of an entire line of memory thereby to terminate the transmission of further FETCH pulses to said device.

61. A device as recited in claim 57 wherein:

said entry means includes means for entering a header symbol control signal in an addressed line of memory thereby to identify successive lines of character data stored in memory as a related block of data, and said read-out means responds to receipt of the header symbol as read out and transmitted thereto by said device to terminate temporarily the further transmission of FETCH pulses to said device.

62. A device as recited in claim 61, further comprising:

means for re-initiating read-out and transmission of character data from said memory following said temporary termination, thereby to provide for read-out and transmission to, and receipt by, said read-out means of the character data of each block thereof stored in said memory, in individual succession as to each of a plurality of such blocks stored in memory.

63. A device for use with read-out means as recited in claim 58 wherein said read-out means responds to each end of line code received from said device to generate an end of line sequence.

64. A device for use with read-out means as recited in claim 57 wherein said read-out means further comprises formatting means for responding to the character data read from each position in memory to convert the said data into a serial bit stream including coding and control bits for transmission to said further utilization means.

65. A device for use with read-out means as recited in claim 57 wherein said read-out means further includes means for receiving and transmitting to said device fixed character data and related control signals, and said addressing means of said device is responsive thereto to address the line and positions of memory in accordance with the received character data and related control signals for entry of the fixed character data into the thereby addressed, corresponding positions of the memory.

66. A device for use with read-out means as recited in claim 57 wherein said read-out means further comprises formatting means for establishing a format of the data read from said memory of said device corresponding to the format of the data as entered into said device by said entry means, thereby to control said utilization means to reproduce the transmitted character data in the format in which said character data was entered.

67. A device for use with read-out means as recited in claim 66 wherein said utilization means comprises a printer responsive to the output signals of said read-out means for printing a hard copy of the character data read out from said memory of said device in accordance with the format of that data as entered into memory.

68. A device as recited in claim 1 wherein said electrical energy storing means further comprises means for detecting the depletion of electrical energy in said first cell below said predetermined level to provide an indication of such depletion.

69. A device as recited in claim 68 wherein said detecting and indicating means comprises means for producing a pulsating electrical output to provide a pulsating electrical energy depletion indication.

70. A device as recited in claim 69 wherein said detecting and indicating means comprises:

means for producing a pulsating electrical output, and means for supplying said pulsating electrical output to said display means to provide a pulsating visual display as said electrical energy depletion indication.

71. A device as recited in claim 1 wherein:

said connecting means connects said first cell and said second cell to permit charging of said second cell by said first cell while normally enabling said first cell to supply electrical energy, and to prevent charging of said first cell by said second cell upon enabling said second cell to supply electrical energy at least to said memory.

72. A device as recited in claim 1 wherein:

said first cell is replaceable, and said connecting means enables said second cell to supply energy to at least said memory means for maintaining storage of said coded signals entered and stored therein during removal of said first cell.

73. A self-contained, hand-held portable data collection device for receiving and storing character data for subsequent read-out and transmission of the character data in a desired format to a utilization means, comprising:

entry means for supplying coded signal representations of character data and controls, the character data coded signals to be stored in said device at addresses determined in accordance with control coded signals associated with the character data coded signals, a random access memory having plural character data storage positions arranged in plural lines, each line including plural said storage positions, means for continuously recirculating the contents of the storage positions of each line of said memory, means for addressing the memory in accordance with the control coded signals for entry and storage of character data coded signals in addressed positions of said memory, display means for visually displaying characters represented by character data coded signals, output connection means, said addressing means including means for selectively addressing each line of said memory for supplying at least selected ones of the coded signals of corresponding, selected storage positions of the addressed line during said recirculation of the contents of the storage positions of the line, to said display means for display thereby, and to said output connection means to be available for transmission thereof to a utilization means, and electrical energy storing means integral with said self-contained hand-held portable data collection device for supplying electrical energy to the aforesaid means for operation of the said device, said addressing means includes counter means for accumulating a count in accordance with an addressed line of said memory, and said supplying means supplies said count of said count accumulation means along with said at least selected ones of the recirculating coded signals of the addressed line of said memory to said display means for display of the line number in association with the characters defined by the said at least selected ones of the coded signals of that addressed line, and to said output connection means to be available for transmission thereof to a utilization means, thereby to identify the line of the coded signals as displayed and as available for transmission.

74. A device as recited in claim 73 for use with a read-out means to which said device is connected for reading out the data from said memory of said device for supply of the read-out data to the utilization means, and wherein said device further includes:

means operable when said device is connected to said read-out means to produce a connect signal for placing said device in a read-out and data transmit mode of operation, and said addressing means is operable in said transmit mode of said device, to address and read-out, in succession, the coded signals of the successive memory storage positions of each line, in succession for plural such lines of said memory for supply to said output connection means, and said read-out means is operable to read out and transmit the count of said count accumulation means in association with the succession of coded signals of the successive storage positions of the line of said memory addressed in accordance with the count of said count accumulation means, for each successive count and the corresponding successive line of said memory.

* * * * *

UNITED STATES PATENT OFFICE
CERTIFICATE OF CORRECTION

Patent No. 4,016,542      Dated April 5, 1977

Inventor(s) Leo L. Azure, Jr.

It is certified that error appears in the above-identified patent and that said Letters Patent are hereby corrected as shown below:

In the "Abstract", line 22, change "input-out-" to --input/out- --.

Column 1, line 16, change "procesing" to --processing--.

Column 2, line 15, change "wee" to --were--;

Column 2, line 30, change "case" to --cause--.

Column 3, line 32, change "seed" to --sed--.

Column 4, line 28, change "terface" to --terfaces--;

Column 4, line 28, change "ASCH" to --ASCII--.

Column 4, lines 66-67, change "keyboard entry portion of the portable data gathering device" to --control circuitry--.*

Column 6, line 26, change "automtically" to --automatically--.

Column 12, line 5, change "extend" to --extent--.

Column 14, line 41, change "mans" to --means--.

Column 18, line 51, change "nrmal" to --normal--;

Column 18, line 52, change "tippd" to --tipped--.

Column 19, line 22, change "$(C_S)$" to --$(\overline{C}_S)$--.

UNITED STATES PATENT OFFICE
CERTIFICATE OF CORRECTION

Patent No. 4,016,542        Dated  April 5, 1977

Inventor(s)   Leo L. Azure, Jr.

It is certified that error appears in the above-identified patent and that said Letters Patent are hereby corrected as shown below:

Column 20, line 11, change "$\overline{\text{XMIT*}}$" to -- $\overline{\text{XMIT*}}$ --, Column 22, line 59, change "$\overline{\text{INCREm}}$" to -- $\overline{\text{INCREM}}$ --.

Signed and Sealed this

*Twenty-seventh* Day of *December 1977*

[SEAL]

Attest:

RUTH C. MASON
*Attesting Officer*

LUTRELLE F. PARKER
*Acting Commissioner of Patents and Trademarks*

UNITED STATES PATENT OFFICE
CERTIFICATE OF CORRECTION

Patent No. 4,016,542      Dated April 5, 1977

Inventor(s) Leo L. Azure, Jr.

It is certified that error appears in the above-identified patent and that said Letters Patent are hereby corrected as shown below:

On the cover sheet in item [75] Inventor: "Leo L. Azure" should read -- Leo L. Azure, Jr. --.

Signed and Sealed this

Sixth Day of June 1978

[SEAL]

Attest:

RUTH C. MASON
*Attesting Officer*

DONALD W. BANNER
*Commissioner of Patents and Trademarks*

UNITED STATES PATENT AND TRADEMARK OFFICE
CERTIFICATE OF CORRECTION

PATENT NO. : 4,016,542
DATED : April 5, 1977
INVENTOR(S) : Leo L. Azure, Jr.

It is certified that error appears in the above—identified patent and that said Letters Patent is hereby corrected as shown below:

On The Title Page, Item 73, should read

-- Assignee: Azurdata, Incorporated --.

Signed and Sealed this

Twenty-ninth Day of April 1980

[SEAL]

Attest:

SIDNEY A. DIAMOND

Attesting Officer     Commissioner of Patents and Trademarks